(12) United States Patent
Childs et al.

(10) Patent No.: US 7,604,746 B2
(45) Date of Patent: Oct. 20, 2009

(54) PERVAPORATION COMPOSITE MEMBRANES

(75) Inventors: Ronald F. Childs, Burlington (CA); Jie Yu, Hamilton (CA)

(73) Assignee: McMaster University, Hamilton, Ontario (CA)

( * ) Notice: Subject to any disclaimer, the term of this patent is extended or adjusted under 35 U.S.C. 154(b) by 617 days.

(21) Appl. No.: 11/114,872

(22) Filed: Apr. 25, 2005

(65) Prior Publication Data

US 2006/0000778 A1  Jan. 5, 2006

Related U.S. Application Data

(60) Provisional application No. 60/565,519, filed on Apr. 27, 2004.

(51) Int. Cl.
*B01D 61/00* (2006.01)
*B01D 39/00* (2006.01)
*B01D 29/00* (2006.01)
*B01D 15/00* (2006.01)
*B32B 5/14* (2006.01)

(52) U.S. Cl. .................. 210/640; 210/500.43; 210/490; 210/644; 210/500.27; 264/41; 428/310.4; 428/304.4; 428/306.6; 96/4; 96/12; 96/14; 95/52; 435/177; 435/180

(58) Field of Classification Search ................................ 210/500.27–500.43, 490, 638, 640, 644; 264/41; 428/310.5, 304.4, 306.6; 96/4, 12, 96/14; 95/52; 435/177, 180
See application file for complete search history.

(56) References Cited

U.S. PATENT DOCUMENTS

| 4,704,324 A | * | 11/1987 | Davis et al. ............... 428/308.4 |
| 4,755,299 A |   | 7/1988  | Brüschke |
| 4,802,988 A |   | 2/1989  | Bartels et al. |
| 4,824,916 A | * | 4/1989  | Kershner et al. ............ 525/420 |
| 4,894,165 A |   | 1/1990  | Fibiger et al. |
| 4,909,943 A |   | 3/1990  | Fibiger et al. |

(Continued)

FOREIGN PATENT DOCUMENTS

CA  2092837  3/1994

(Continued)

OTHER PUBLICATIONS

Lee et al.; *Cationic/Anionic Interpenetrating Polymer Network Membranes for the Pervaporation of Ethanol-Water Mixture*; Journal of Membrane Science; vol. 52; (1990); pp. 157-172.

(Continued)

*Primary Examiner*—Ana M Fortuna
(74) *Attorney, Agent, or Firm*—Christie, Parker & Hale, LLP

(57) ABSTRACT

The present application discloses a composite membrane comprising (a) a support member that has a plurality of pores extending through the support member and (b) a cross-linked copolymer comprising (i) a cationic monomer and an anionic monomer and/or (ii) a zwitterionic monomer, which cross-linked copolymer fills the pores of the support member, the cross-linked copolymer having a permeability for a fluid that is dependent on the polarity of the fluid, wherein the permeability increases with increasing polarity.

The present application also discloses a process for the preparation of the composite membrane, a pervaporation apparatus comprising the composite membrane, and methods for the use of the composite material in separation and dehydration processes.

31 Claims, 8 Drawing Sheets

U.S. PATENT DOCUMENTS

| | | | |
|---|---|---|---|
| 4,992,221 | A | 2/1991 | Malon et al. |
| 5,049,275 | A | 9/1991 | Gillberg-LaForce et al. |
| 5,236,588 | A | 8/1993 | Zhang et al. |
| 5,246,587 | A | 9/1993 | Tomaschke |
| 5,254,261 | A | 10/1993 | Tomaschke et al. |
| 5,334,314 | A | 8/1994 | Neel et al. |
| 5,436,068 | A | 7/1995 | Kobayashi et al. |
| 5,464,538 | A * | 11/1995 | Schmidt et al. ............. 210/490 |
| 5,755,964 | A | 5/1998 | Mickols |
| 5,922,203 | A | 7/1999 | Tomaschke |
| 6,063,278 | A | 5/2000 | Koo et al. |
| 6,258,276 | B1 | 7/2001 | Mika et al. |
| 6,635,104 | B2 * | 10/2003 | Komkova et al. ................ 96/4 |
| 7,247,370 | B2 * | 7/2007 | Childs et al. ............. 428/310.5 |
| 7,316,919 | B2 * | 1/2008 | Childs et al. ................ 435/177 |
| 2006/0000778 | A1 * | 1/2006 | Childs et al. ................ 210/644 |

FOREIGN PATENT DOCUMENTS

| | | |
|---|---|---|
| CA | 2369703 | 12/2000 |
| CA | 2376993 | 9/2003 |
| EP | 0381477 | 8/1990 |
| WO | WO 97/17129 | 5/1997 |
| WO | WO 98/17377 | 4/1998 |
| WO | WO 99/40996 | 8/1999 |
| WO | WO 00/50160 | 8/2000 |

OTHER PUBLICATIONS

Yamasaki et al.; *Effect of Evaporation Time on the Pervaporation Characteristics through Homogeneous Aromatic Polyamide Membranes. II. Pervaporation Performances for Ethanol/Water Mixture*; Journal of Applied Polymer Science; vol. 60; (1996); pp. 743-748.

Huang et al.; *Dehydration Of Isopropanol By Pervaporation Using Aromatic Polyetherimide Membranes*; Separation Science And Technology; vol. 28; (1993); pp. 2035-2048.

Krasemann et al.; *Ultrathin Self-Assembled Polyelectrolyte Membranes For Pervaporation*; Journal Of Membrane Science; vol. 150; (1998); pp. 23-30.

Krasemann et al.; *Self-Assembled Polyelectrolyte Multilayer Membranes with Highly Improved Pervaporation Separation of Ethanol/Water Mixtures*; Journal of Membrane Science; vol. 181; (2001); pp. 221-228.

Haack et al.; *Pervaporation Separation of Water/Alcohol Mixtures Using Composite Membranes Based on Polyelectrolyte Multilayer Assemblies*; Journal of Membrane Science; vol. 184; (2001); pp. 233-243.

Shieh et al.; *Pervaporation with Chitosan Membranes II. Blend Membranes of Chitosan and Polyacrylic Acid and Comparison of Homogeneous and Composite Membrane Based on Polyelectrolyte Complexes of Chitosan and Polyacrylic Acid for the Separation of Ethanol-Water Mixtures*; Journal of Membrane Science; vol. 127; (1997); pp. 185-202.

Lee et al.; *Cationic/Anionic Interpenetrating Polymer Network Membranes for the Pervaporation of Ethanol-Water Mixture*; Journal of Membrane Science; vol. 52; (1990); pp. 157-172 (missing pp. 158-159, 162-163, 166-167, 170-171).

Morigami et al.; *The First Large-Scale Pervaporation Plant Using Tubular-Type Module with Zeolite NaA Membrane*; Separation and Purification Technology, vol. 25; (2001); 251-260.

Berg et al.; *Zeolite A Membranes Synthesized on a UV-Irradiated TiO2 Coated Metal Support: the High Pervaporation Performance*; Journal of Membrane Science; vol. 224; (2003); pp. 29-37.

Goldman et al., *A Zeolite/Polymer Membrane for Separation of Ethanol-Water Azeotrope*; Journal of Applied Polymer Science, vol. 37; (1989); pp. 1791-1800.

Okumus et al.; *Effect of Fabrication and Process Parameters on the Morphology and Performance of a PAN-Based Zeolite-Filled Pervaporation Membrane*; vol. 223; (2003); pp. 23-38.

Yamaguchi et al.; *Plasma-Graft Filling Polymerization: Preparation of a New Type of Pervaporation Membrane for Organic Liquid Mixtures*; *Macromolecules*; vol. 24; (1991); pp. 5522-5527.

Ulbricht et al.; *Novel High Performance Photo-Graft Composite Membranes for Separation of Organic Liquids by Pervaporation*; Journal of Membrane Science; vol. 136; (1997); pp. 25-33.

Hirotsu et al., *Water-Ethanol Permseparation by Pervaporation Through the Plasma Graft Copolymeric Membranes of Acrylic Acid and Acrylamide*; Journal of Applied Polymer Science; vol. 36; (1988); pp. 177-189.

Frahn et al.; *Separation of Aromatic/Aliphatic Hydrocarbons by Photo-Modified Poly(acrylonitrile) Membranes*; Journal of Membrane Science; vol. 234; (2004); pp. 55-65.

Jonquières, et al., *Industrial state-of-the-art of pervaporation and vapour permeation in the western countries*, Journal of Membrane Science; vol. 206, (2002), pp. 87-117.

Yamasaki et al. [J. Appln. Polym. Sci. 60(1996) 743-48], on Order.

Huang et al. [Sep. Sci. Tech. 28 (1993) 2035-48], on Order.

Krasemann et al. [J. Membr. Sci. 150 (1998) 23-30], on Order.

Krasemann et al. [J. Membr. Sci. 181 (2001) 221-8], on Order.

Haack et al. [J. Membr. Sci. 184 (2001) 233-43], on Order.

Shieh et al. [J. Membr. Sci. 127 (1997) 185-202], on Order.

Lee et al. [J. Membr. Sci. 52 (1990) 157-72], on Order.

Morigami et al. [Sep. Pur. Tech. 25 (2001) 251-60], on Order.

Berg et al. [J. Membr. Sci. 225 (2003) 29-37], on Order.

Goldman et al. [J. Appl. Polym. Sci. 37 (1989) 1791-800], on Order.

Okumus et al. [J. Membr. Sci. 223 (2003) 23-38], on Order.

Yamaguchi et al. [Macromolecules 24 (1991) 5522-27], on Order.

Ulbricht et al. [J. Membr. Sci. 136 (1997) 25-33], on Order.

Hirotsu et al. [J. Appl. Polym. Sci. 36 (1988) 177-89], on Order.

Frahn et al. [J. Membr. Sci., 234 (2004) 55-65], on Order.

International Search Report of PCT/CA02/01102, dated Mar. 18, 2003.

International Preliminary Examination Report of PCT/CA02/01102, dated Apr. 7, 2003.

Mika, et al., "a new class of polyelectrolyte-filled microfiltration membranes with environmentally controlled porosity" Journal of Membrane Science, vol. 108, 1995, pp. 37-56, Amsterdam, NL, XP004041222.

Yamaguchi, T., et al., "Evidence and Mechanisms of Filling Polymerization by Plasma-Induced Graft Polymerization", J. Polym. Sci. Part A. Polymer Chem. 34,1203-1208 (1996).

Dai, W.S., et al., "Hollow fiber-supported hydrogels with mesh-size asymmetry", J. Membrane Science, 171, (2000), 79-86.

Pandey, A.K., et al., "Formation of Pore-Filled Ion-Exchange Membranes with in-situ Cross-linking: Poly(vinylbenzyl ammonium salt) Filled Membranes", J. Polym. Sci. Part A Polymer Chemistry, 39, (2001) 807-820.

Winnik, F. M., et al., "Polyacrylic Acid Pore-filled Microporous Membranes and Their Use Membrane-Mediated Synthesis of Nanocrystalline Ferrihydrite", Can. J. Chem. 76 (1998), 10-17.

Koprinarov, I. N., et al., "Quantitative Mapping of Structured Polymeric Systems Using Singular Value Decomposition Analysis of Soft X-ray Images", J. Phys. Chem. B (2002) 106, 5358-5364.

Lloyd, D. R., et al., "Microporous Membrane Formation Via Thermally Induced Phase Separation.I.Solid-Liquid Phase Separation", J. Membr. Sci., 52 (1990) 239-261.

Mika, A.M., et al., "Porous Polyelectrolyte Filled Membranes: Effect of Cross-Linking on Flux and Separation", J. Membrane Science, 135, (1997) 81-92.

Mika, A.M., et al., "Poly(4-vinylpyridine)-filled microfiltration membranes: Physicochemical Properties and Morphology", J. Membrane Science, 136, (1 997) 221-232.

Stachera, D.M., et al., "Acid Recovery Using Diffusion Dialysis with Poly(4-vinylpyidine)-filled Microporous Membranes", J. Memb. Sci. 148 (1998) 119-127.

Mika, A.M., et al., "Chemical Valves Based on Poly(4-vinylpyidine)-filled Microfiltration Membranes", J. Memb. Sci. 153, (1999) 45-56.

Mika, A.M., et al., "Acid/Base Properties of Poly(4-vinylpyridine) Anchored within Microporous Membranes", J. Memb. Sci.. 152 (1999) 129-140.

Mika, A.M., et al., Ultra-low Pressure Water Softening: A New Approach to Membrane Construction, Desalination, 121 (1999) 149-158.

Childs, RF., et al.. Nanofiltration Using Pore-Filled Membranes: Effect of Polyelectrolyte Composition on Performance, Separ. Purif. Technol., 22-23 (2001) 507-517.

Mika, A.M., et al., "Calculation of the Hydrodynamic Permeability of Gels and Gel-Filled Microporous Membranes", Ind. Eng. Chem. Res., vol. 40, No. 7 (2001) 1694-1705.

Mulder, M., "Basic Principles of Membrane Technology" second Edition, Kluwer Academic Publishers, Dordrecht, the Netherlands, chapter III, (1991), pp. 54-109.

Loeb, S., et al., "Sea water Demineralization by Means of an Osmotic Membrane", Advances in Chemistry Series, 38 (1963), 117-132.

Lonsdale, H.K., et al., "Transport Properties of Cellulose Acetate Osmotic Membranes", J. App. Polym. Sci., 9, (1965), 1341-1362.

Lonsdale, H.K., "The growth of Membrane Technology", J. Membr. Sci., 10, (1982), 81-181.

P. van de Witte, et al., "Phase separation processes in polymer solutions in relation to membrane formation", J. Membr. Sdi. 117:(1996), 1-31.

Zeman, L., et al., "Formation of air-cast cellulose acetate membranes. Part I. Study of macrovoid formation", J. Membr. Sci., 84, (1993), 93-106.

Zeman, L., et al., "Formation of air-cast cellulose acetate membranes Part II. Kinetics of demixing and microvoid growth", J. Membr. Sci., 87, (1994), 267-279.

Cadotte, J.E., et al., "Thin-Film Composite Reverse-Osmosis Membranes: Origin, Development and Recent Advances"; In Synthetic Membranes. vol. 4 Desalination; Turbak, A. F., ed. American Chemical Society: Washington, 1981; p. 305-326.

Cadotte, J. E., "Evolution of Composite Reverse Osmosis Membranes"; Material Science of Synthetic Membranes; Lloyd, D. R., ed. American Chemical Society: Washington, 1985; p. 273-294.

Hirose. M., et al., "Effect of skin layer surface structures on the flux behaviour of RO membranes", J. Membr. Sci., 121, (1 996), 209-215.

Hirose, M., et al., "The relationship between polymer molecular structure of RO membrane skin layers and their RO performances", J. Membrane Sci., 123, (1997), 151-156.

Kwak, S.-Y., et al., "Details of Surface Features in Aromatic Polyamide Reverse Osmosis Membranes Characterized by Scanning Electron and Atomic Force Microscopy", J. Polym. Sci. B., Polym. Phys. 37, (1999), 1429-1440.

Kwak, S.-Y., "Relationship of relaxation property to reverse osmosis permeability in aromatic polyamide thin-film-composite membranes", Polymer, 40, (1999), 6361-6368.

Peterson, R. J., et al., "Thin Film Composite Reverse Osmosis Membranes"; In Handbook of Industrial Membrane Technology, Porter, M. E., ed. Noyes Publications: Park Ridge, (1990), pp. 307-348.

Dytnerskii, Y. I., et al, "Study of the Porous Structure and Selective Properties of Membranes Obtained by Plasma Polymerization in a Glow Discharge", Colloid Journal of the USSR, (1982), 1024-1028.

Uragami, T., et al., "Studies on Syntheses and Permeabilities of Special Polymer Membranes", Angew. Makromol. Chem., 95 (1981) 45-54.

Yokoyama, Y., et al., "Enzyme Immobilization in an Asymmetric Charged Membrane", J. Membr. Sci., 38 (1988), 223-236.

Yokoyama. Y., et al., "Preparation of a Single Bipolar Membrane by Plasma-Induced Graft Polymerization", J. Membr. Sci., 43, (1989), 165-175.

Childs, R. F., et al.. "Formation of Pore-filled Microfiltration Membranes Using a Combination of Modified Interfacial Polymerization and Grafting", J. Polym. Sci, A. Polym Chem 40, (2002) pp. 242-250.

Mika, A. M., et al., "Salt separation and hydrodynamic permeability of a porous membrane filled with pH sensitive gel", J. Membrane Science, 206, (2002) 19-30.

Mika, Alicja M., et al., "Ultra-low pressure water softening with pore-filled membranes" Desalination, 140 (2001), 265-275.

Stachera, D. M., et al., "Tuning the acid recovery performance of poly(4-vinylpyridine)-filled membranes by the introduction of hydrophobic groups", J. Membrane Science, 187, (2001), pp. 213-225.

Yeom, C. K., et al., "A Study on Permeation Behavior of a Liquid Mixture Through PVA Membranes Having a Crosslinking Gradient Structure in Pervaporation", J. App. Polym. Sci. (1996), 59, 1271-1279.

Li, R.H.., et al., "Characterization and mechanical support of asymmetric hydrogel membranes based on the interfacial cross-linking of poly(vinyl alcohol) with toluene diisocyanate", J. Membr. Sci., 11 1 (1996) 115-122.

Mccrory, "Impact of Gel Morphology on Pore-Filled Membranes"; PhD. Thesis, McMaster University (2001), pp. 119-157.

Yamaguchi, T., et al., "Design of Pervaporation Membrane for Organic-Liquid Separation Based on Solubility Control by Plasma-Graft Filling Polymerization Technique", Ind. Eng. Chem. Res. 32, (1993), 848-853.

Suzuki, F., et all "Grafting of siloxane on poly(styrene-co-maleic acid) and application of this grafting technique to a porous membrane for gas separation", Journal of membrane Science 104 (1995) 283-290.

Christopher T.C. McCrory, M.Sc. "Impact of Gel Morphology on Pore-Filled Membranes," *A Thesis Submitted to the School of Graduate Studies in Partial Fulfilment of the Requirements for the Degree Doctor of Philosophy in Chemistry*, McMaster University, Jul. 2001, 190 pages, National Library of Canada, Ottawa, Canada. [0-612-71865-4].

* cited by examiner

PERVAPORATION COMPOSITE MEMBRANES

CROSS-REFERENCE TO RELATED APPLICATIONS

This application claims priority to and the benefit of U.S. Provisional Patent Application No. 60/565,519, filed Apr. 27, 2004, which is incorporated herein by reference.

FIELD OF THE INVENTION

The present invention relates to a composite membrane suitable for a pervaporation process, to its preparation, and to its use in the separation of fluids in a pervaporation process.

BACKGROUND OF THE INVENTION

The separation or removal of water from organic liquids is an important process within the chemical, petrochemical, and energy industries. Water removal is important in the primary production of a wide range of organic solvents, in the recovery and recycling of used solvents, and in the removal of water from chemical equilibrium reactions to drive the reaction towards a preferred product. Frequently, the removal of water is complicated by the formation of azeotropes of the solvent with water, precluding use of a simple distillation approach to produce an anhydrous solvent. The best example of such a problem occurs in the production of ethanol, where an azeotrope with ca. 95.6% ethanol and 4.4% water is formed. The formation of this azeotrope greatly hinders the production of anhydrous ethanol and significantly adds to cost of this solvent.

Various processes that have been used to dehydrate organic liquid streams include fractional distillation, fractional distillation using entrainers to overcome the azeotrope problem, adsorption processes, and newer membrane-based techniques such as pervaporation and vapor permeation.

Pervaporation is a process that involves a membrane in contact with a liquid on the feed or upstream side and a vapor on the permeate or downstream side. Usually, a vacuum or an inert gas is applied on the vapor side of the membrane to provide a driving force for the process. Typically, the downstream pressure is lower than the saturation pressure of the permeate. Vapor permeation is quite similar to pervaporation, except that a vapor is contacted on the feed side of the membrane instead of a liquid. As membranes suitable for pervaporation separations are typically also suitable for vapor permeation separations, use of the term "pervaporation" herein encompasses both "pervaporation" and "vapor permeation".

The efficiency of a pervaporation membrane can be expressed as a function of its selectivity and of its specific flux. The selectivity is normally given as the ratio of the concentration of the better permeating component to the concentration of the poorer permeating component in the permeate, divided by the corresponding concentration ratio in the feed mixture to be separated:

$$\alpha = \frac{y_w / y_i}{x_w / x_i}$$

wherein $y_w$ and $y_i$ are the content of each component in the permeate, and $x_w$ and $x_i$ are the content of each component in the feed, respectively.

The trans-membrane flux is a function of the composition of the feed. It is usually given as permeate amount per membrane area and per unit time, i.e. $Kg/m^2$ hr. In order to obtain a high trans-membrane flux, it is desirable to operate the pervaporation process at the highest possible temperature. However, this means that the membrane will be in contact with a feed mixture, which often has a high concentration of organic components, at high temperature. To achieve an economical lifetime for the membrane, it is preferable that all components of the membrane be durable under such demanding conditions.

In the pervaporation process, both mass and heat transfer occurs. The solution-diffusion model can describe mass transfer where the selectivity is determined by selective sorption and/or selective diffusion. For pervaporation dehydration membranes, selective sorption is governed by the presence of the active centers in the polymer that are capable of specific interactions with a polar fluid. Selective diffusion is governed by the rigidity and the regularity of the polymer structure and also by the construction of the polymer's interspace.

A variety of different types of membranes and membrane constructs have been described for use in pervaporation dehydration processes. The materials used to prepare the membranes include hydrophilic organic polymers such as polyvinylalcohol, polyimides, polyamides, and polyelectrolytes. In addition, inorganic materials such as molecular sieves and zeolites have been used.

Initially, polymer-based pervaporation membranes comprised dense, homogeneous membranes. Typical examples of such membranes are described by Yamasaki et al. [J. Appl. Polym. Sci. 60 (1996) 743-48]. These membranes suffer from low fluxes as they are fairly thick. While the flux of the membranes can be increased by decreasing the thickness of the membranes, this leads to a decrease in mechanical strength and robustness.

Two routes have been used to overcome the problem encountered by the above homogeneous membranes. The first route involves the use of an asymmetric membrane in which a dense surface layer is supported on a more porous material made from the same polymer. A typical example of such an asymmetric membrane is disclosed by Huang et al. [Sep. Sci. Tech. 28 (1993) 2035-48]. The second route involves the formation of a dense thin film on the surface of a suitable support membrane, wherein the chemical composition of the dense surface layer and the supporting membrane are typically different. Typically, the support membrane is an ultrafiltration membrane that may contain an incorporated fabric to provide additional strength. Examples of these thin film composite membranes are described in U.S. Pat. Nos. 4,755,299, 5,334,314, 4,802,988 and EP 0,381,477. In U.S. Pat. No. 4,755,299, a dense cross-linked polyvinyl alcohol layered composite membrane designed for dehydration of organic solvents is described as having a flux of 0.3 kg/m² hr and a selectivity of 250 when separating a solution comprising 80% isopropyl alcohol (IPA) and 20% water at 45° C. One major disadvantage of these thin-film composite membranes, however, is their fragility. For example, the commonly used cross-linked poly(vinylalcohol) films supported on polyacrylonitrile ultrafiltration membrane supports are readily damaged through the formation of cracks in the films and through parts of the film falling away from the support. Great care must therefore be taken when mounting and using these membranes. It is also difficult to prepare such membranes in such a way that they are free of defects.

A special form of the thin-film composite membranes is referred to as a "Simplex" membrane. These are made up of thin films using alternating layers of oppositely charged polyelectrolytes. The membranes are made by successive immersions in solutions of the two different polyelectrolytes such that a multilayer complex is formed (see for example Krasemann et al. [J. Membr. Sci. 150 (1998) 23-30]; Krasemann et al. [J. Membr. Sci. 181 (2001) 221-8], and Haack et al. [J. Membr. Sci. 184 (2001) 233-43]). In Haack et al., a Simplex membrane with six double layers of poly(ethylenimine) and alginic acid has a selectivity higher than 10,000 and a flux of 0.3 kg/m$^2$ hr in the pervaporation dehydration of 88 wt. % IPA at 50° C. While a high selectivity and reasonable fluxes can be achieved with the Simplex membranes, these membranes are complex to prepare as they require multiple coating steps. In order to get ideal performance, up to 60 dipping operations are sometimes needed. Another significant drawback lies in the fact that these membranes cannot tolerate feed water contents higher than 25% without loss of some of the multiple layers.

Mixtures or blends of oppositely charged polymers have been used to form homogeneous dense membranes. However, these membranes typically have low fluxes as they are relatively thick. Shieh and Huang [J. Membr. Sci. 127 (1997) 185-202] disclose homogeneous membranes prepared by casting a solution containing chitosan (positively charged) and polyacrylic acid (negatively charged), to form a polymer blend membrane. The thickness of the resulting membrane is between 20 μm and 40 μm and the performance of this membrane is poor in term of flux (flux of 0.03 kg/m$^2$ hr and a selectivity of 2216 with a 95 wt. % ethanol/water feed at 30° C.). In another example, Lee et al. [J. Membr. Sci. 52 (1990) 157-72] use dense membranes comprising an interpenetrating polymer network (IPN) of two polymers of opposite charge (acrylic acid and polyurethane) for the pervaporation of ethanol/water mixtures. In this case, the swelling ratio of the cast film is controlled by cation/anion interactions between the two IPNs. This membrane has a rather low selectivity and moderate flux when used for the dehydration of ethanol/water solutions.

Zeolites and molecular sieves are known to have a high affinity for water. As a result, there has been considerable work focused on trying to incorporate zeolites as the active component or layer in a membrane, and thin zeolite films supported on ceramic membranes display very high fluxes and separation factors with water/alcohol mixtures. However, it is difficult to make these membranes free of defects because of cracking, and these membranes are expensive to prepare. Y. Morigami et al. [Sep. Pur. Tech. 25 (2001) 251-60] have described the first large-scale pervaporation plant using zeolite NaA membrane with tubular-type module. Berg et al. [J. Membr. Sci. 224 (2003) 29-37] prepared high performance zeolite A membranes with Titania support, with some membranes having 3.5 μm thickness and a selectivity of 54,000 and flux of 0.86 Kg/m$^2$ hr when treating 95 wt. % ethanol/water at 45° C., which significantly outperforms other known membranes. This superior performance is ascribed to the pretreatment of the TiO$_2$-support with UV-photons, which improves the hydrophilicity of the support and thus the attachment of the zeolite to the support. However, these membranes are very sensitive to the formation of defects caused by flaws in the support or by incorrect membrane handling. Compared with polymeric membranes, zeolite membranes are generally less swollen, more inert to chemicals and can endure high temperatures. However, zeolite membranes are brittle, and their cost is much higher than for polymeric membranes.

An alternative approach to the above involves the incorporation of zeolite particles into a polymeric support. Membranes of this type typically have low separation factors, particularly when the fluxes are maximized. For example, Zeolite NaA-filled poly(vinylchloride) (PVC) membranes were reported by Goldman et al. [J. Appl. Polym. Sci. 37 (1989) 1791-800]. By adding NaA zeolite absorbents, the performance of a PVC membrane was changed from a selectivity of 250 and a flux of 0.51 Kg/m$^2$h to a selectivity of 7 and a flux of 5.68 Kg/m$^2$h. Another example of absorbent-filled membranes was reported by Okumus et al. [J. Membr. Sci. 223(2003) 23-38] where zeolites (3A, 4A and 13X) were added as fillers to a base poly(acrylonitrile) (PAN) membrane. At optimum zeolite content, the flux is increased about nine-fold with a seven-fold loss of selectivity relative to homogeneous PAN membranes.

Another approach that has been used to form pervaporation membranes is a "pore-filled" construct. Mika et al. [U.S. Pat. No. 6,258,276] disclose that a cross-linked polyelectrolyte incorporated into the pores of a support member can be used for pervaporation dehydration. Membranes consisting of cross-linked poly(4-vinylpyridinium salts) exhibit reasonably high fluxes but very low separation factors in the dehydration of ethanol. These membranes consist of a single charged polymer. There are other reports of pore-filled membranes developed for pervaporation purposes. These include the work of Yamaguchi et al. [Macromolecules 24 (1991) 5522-27] in which methyl acrylate was grafted to the walls of an ultrafiltration (UF) membrane using a plasma activation process. These membranes, which consist of a single polymer within the pores of the membrane, have a flux of 0.5 Kg/m$^2$ hr and a selectivity of 7 when treating 50 wt. % benzene/cyclohexane at 50° C. Ulbricht et al. [J. Membr. Sci. 136 (1997) 25-33] also describe a pore-filled membrane comprising a grafted acrylate. The impact of side-group functionality (hydrophilicity, size) and preparation parameters (monomer concentration, UV irradiation time) was analyzed using solutions comprising methanol and less polar hydrocarbons. Pervaporation tests with methanol/methyl tert-butyl ether (MTBE) at 50° C. were performed with these membranes, and for methanol feed concentration between 7 and 20%, the fluxes were between 0.75 and 1.5 Kg/m$^2$ hr and the selectivity between 80 and 45. Hirotsu et al. [J. Appl. Polym. Sci. 36 (1988) 177-89] grafted acrylic acid and acrylamide comonomers into the pores of a polypropylene support member by plasma method, then treated these membranes with a sodium hydroxide solution to get the final ionized membranes. When dehydrating higher than 90 wt. % ethanol solutions, these membranes had both low fluxes and separations.

Membranes comprising pore-grafted copolymers have also been used to separate solutions. Frahn et al. [J Membr. Sci., 234 (2004) 55-65] describe the separation of aromatic/aliphatic hydrocarbons by photo-modified poly(acrylonitrile) supports, in which supports are grafted non-crosslinked linear copolymers that have, in some instances, both positive and negative groups. One of the problems faced in this system is that the grafted linear copolymers can undergo conformational changes, which changes can adversely affect performance. These membranes display a low separation factor and low fluxes when separating aromatic/aliphatic hydrocarbons. Another problem encountered with non-crosslinked systems is that amount of linear copolymer retained within the support member is quite low unless high light intensities or long irradiation times are used.

There is therefore a need for high performance membranes (high flux and high selectivity) that are robust, easy to fabricate, and low cost. Most of the known pervaporation membranes have either high flux or high selectivity, but not both features at the same time. Only zeolite based membranes have both higher fluxes and reasonably high selectivities, but they are more expensive than polymeric membranes, their fabrication is complex, and they are susceptible to cracking and to loss of performance.

BRIEF SUMMARY OF THE INVENTION

The present invention provides a robust, high-performance membrane designed for the selective removal of a polar fluid, such as water, from less polar fluids, such as organic solvents, by a pervaporation process. The composite membrane comprises a support member in which is incorporated a cross-linked copolymer that has both positively and negatively charged functionality in a controlled ratio to give the desired selectivity and flux. By changing the ratio of the charged groups and the amount of the copolymer incorporated into the support, the flux and the selectivity can be controlled for use in specific applications.

In one aspect, the present invention provides a composite membrane comprising
  (a) a support member that has a plurality of pores extending through the support member and
  (b) a cross-linked copolymer comprising (i) a cationic monomer and an anionic monomer and/or (ii) a zwitterionic monomer, which cross-linked copolymer fills the pores of the support member, the cross-linked copolymer having a permeability for a fluid that is dependent on the polarity of the fluid, wherein the permeability increases with increasing polarity.

In another aspect, the present invention provides a pervaporation apparatus comprising the composite membrane as described herein.

In a further aspect, the present invention provides a process for the preparation of the composite membrane described herein, the process comprising
  (i) introducing into the pores of the support member a solution comprising (i) an anionic monomer, a cationic monomer, a cross-linking agent and an initiator, or
  (ii) a zwitterionic monomer, a cross-linking agent and an initiator, and
  (ii) reacting the anionic monomer, the cationic monomer and the cross-linking agent or the zwitterionic monomer and the cross-linking agent to form a cross-linked copolymer that fills the pores of the support member.

In a further aspect, the present invention provides a method for separating fluids of different polarity, a method for dehydrating an aqueous mixture of an organic solvent, and a method for removing a water by-product from a reaction mixture, each method using the composite membrane described herein.

The above and other objects, features and advantages of the present invention will become apparent from the following description when taken in conjunction with the accompanying figures which illustrate preferred embodiments of the present invention by way of example.

BRIEF DESCRIPTION OF THE DRAWINGS

Embodiments of the invention will be discussed with reference to the following Figures:

FIG. 1A is an image of the dense side (smaller pores) of the PAN based membrane, while FIG. 1B is an image of the support layer (larger pores) of the PAN based membrane.

DETAILED DESCRIPTION OF THE INVENTION

Figure 1A:
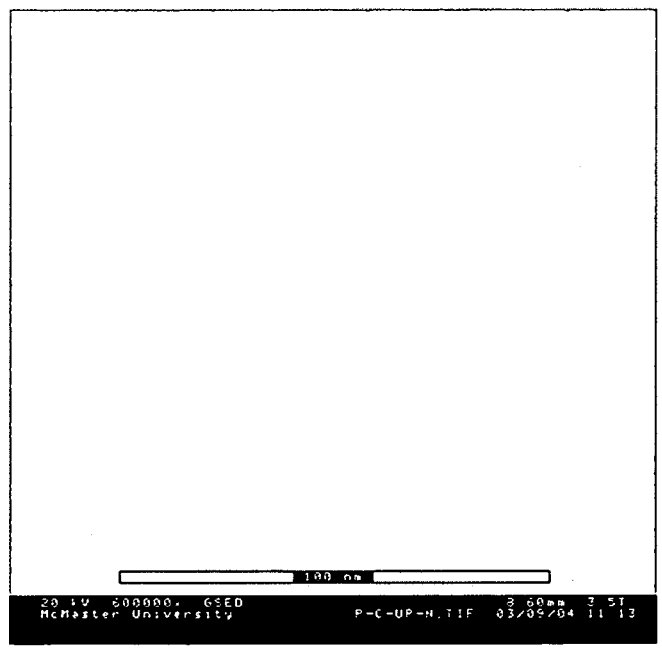
FIG. 1A, and 1B show SEM images of a poly(acrylonitrile) (PAN) based asymmetric composite membrane.

In the composite membrane of the invention, the cross-linked copolymer fills the pores of the support laterally, i.e. substantially perpendicular to the direction of the flow through the composite membrane. By "fill" is meant that, in use, essentially all fluid that passes through the composite membrane must pass through the cross-linked copolymer. A support member whose pores contain cross-linked copolymer in such an amount that this condition is satisfied is regarded as filled. Provided that the condition is met that the fluid passes through the cross-linked copolymer, it is not necessary that the void volume of the support member be completely occupied by the cross-linked copolymer.

The cross-linked copolymer provides the separating function of the composite membrane in pervaporation separations, and the cross-linked copolymer typically swells in the presence of a polar solvent such as water. In some embodiments, the cross-linked copolymer is a hydrogel. The support member provides mechanical strength to the cross-linked copolymer and it impedes the swelling of the cross-linked copolymer when the cross-linked copolymer is swellable.

Preferably, the cross-linked copolymer is anchored within the support member. The term "anchored" is intended to mean that the cross-linked copolymer is held within the pores of the support member, but the term is not necessarily restricted to mean that the cross-linked copolymer is chemically bound to the pores of the support member. The cross-linked copolymer can be held by the physical constraint imposed upon it by enmeshing and intertwining with structural elements of the support member, without actually being chemically grafted to the support member, although in some embodiments, the cross-linked copolymer may become grafted to the surface of the pores of the support member.

The term "cationic/anionic copolymer" when use herein refers to a copolymer prepared with cationic and anionic monomers. By cationic monomer is meant a monomer that has a positive charge or a group that can be ionized to form a positive charge. Similarly, by anionic monomer is meant a monomer that is negatively charged or that has a group that can be ionized to form a negative charge.

The performance of the composite membrane is mainly determined by the properties of the copolymer anchored within the pores of the support member. The presence of both anionic and cationic sites in the copolymer leads to an increase in intramolecular interactions within the copolymer, leading to a more compact copolymer structure when the copolymer swells in the presence of a polar fluid. This compact nature helps to increase the selectivity of composite membranes, as it provides a denser copolymer structure through which the fluids must pass. The selectivity of the composite membranes is also enhanced by the presence of the support member, as beyond providing mechanical strength, the support member also restricts the swelling of anchored copolymer, which again increases the density of the copolymer.

The anionic monomers used in this invention are preferably water soluble, although anionic monomers that display little or no solubility in water can be used. Preferred anionic monomers include unsaturated carboxylic acids or salts or anhydrides thereof, and unsaturated sulfonic acids or salts or anhydrides thereof. Unsaturated anionic monomers may contain one, or more than one, carbon-carbon double bond.

Examples of suitable anionic monomers include acrylic acid, 2-acetamidoacrylic acid, trans-3-benzoylacrylic acid, 2-bromoacrylic acid, 3-chloroacrylic acid, trans-3-(4-chlorobenzoyl)acrylic acid, 2,3-dichloroacrylic acid, 3,3-dichloroacrylic acid, 3,3-dimethylacrylic acid, furylacrylic acid, methacrylic acid, 2-phenylacrylic acid, trans-3-(3-pyridyl)acrylic acid, trichloroacrylic acid, 2-(trifluoromethyl)acrylic acid, propynoic acid (propiolic acid), phenylpropynoic acid, crotonic acid, isocrotonic acid, 3-bromo-2-butenoic acid, 2-chloro-2-butenoic acid, 3-chloro-2-butenoic acid, 2,3-dibromo-4-oxo-2-butenoic acid, 2,3-dichloro-4-oxo-2-butenoic acid, 2,3-dimethyl-2-butenoic acid, 2-ethyl-2-butenoic acid, trans-2-methyl-2-butenoic acid (tiglic acid), cis-2-methyl-2-butenoic acid (angelic acid), 4-oxo-4-phenyl-2-butenoic acid, 2-phenyl-2-butenoic acid, 4,4,4-trifluoro-3-methyl-2-butenoic acid, 3-butenoic acid, 2-hydroxy-4-phenyl-3-butenoic acid, 2-methyl-3-butenoic acid, 2-butynoic acid (tetrolic acid), 2-pentenoic acid, 4-hydroxy-2-pentenoic acid, 2-methyl-2-pentenoic acid (trans), 4-hydroxy-3-pentenoic acid, 4-pentenoic acid, 2,2-dimethyl-4-pentenoic acid, 3-methyl-4-pentenoic acid, 2,4-pentadienoic acid, 2-pentynoic acid, 4-pentynoic acid, 2-hexenoic acid, 2-ethyl-2-hexenoic acid, 3-hexenoic acid, 2-acetyl-5-hydroxy-3-oxo-4-hexenoic acid (dehydracetic acid), 5-hexenoic acid, 2,4-hexadienoic acid (sorbic acid), 1-hexen-1-ylboronic acid, 5-hexynoic acid, shikimic acid, 6-heptenoic acid, 2,6-heptadienoic acid, 6-heptynoic acid, 2-octenoic acid, trans-1-octen-1-ylboronic acid, fumaric acid, bromo-fumaric acid, chloro-fumaric acid, dihydroxyfumaric acid, dimethylfumic acid, fumaric acid monoethyl ester, mesaconic acid, maleic acid, bromomaleic acid, chloromaleic acid, dichloromaleic acid, dihydroxymaleic acid, dibromomaleic acid, maleamic acid, citraconic acid, glutaconic acid, 3-methyl-2-pentenedioic acid, itaconic acid, muconic acid, mucobromic acid, mucochloric acid, acetylenedicarboxylic acid, styrylacetic acid, 3-butene-1,1-dicarboxylic acid, aconitic acid, 3-butene-1,2,3-tricarboxylic acid, 2-acrylamidoglycolic acid, 2-acryamido-2-methyl-1-propanesulfonic acid, 3-allyloxy-2-hydroxy-1-propanesulfonic acid, 2-methyl-2-propene-1-sulfonic acid, 2-propene-1-sulfonic acid, 4-styrene sulfonic acid, 2-sulfoethyl methacrylate, 3-sulfopropyl acrylate, 3-sulfopropyl methacrylate, 3-vinylbenzoic acid, 4-vinylbenzonic acid, tran-2-(4-chlorophenyl)vinylboronic acid, tran-2-(4-fluorophenyl)vinylboronic acid, tran-2-(4-methylphenyl)vinylboronic acid, 2-vinylphenylboronic acid, 4-vinylphenylboronic acid, vinylphosphonic acid, vinylsulfonic acid, monoacryloxyethyl phosphate, cinnamic acid, α-acetamidocinnamic acid, α-bromocinnamic acid, 2-bromocinnamic acid, 3-bromocinnamic acid, 4-bromocinnamic acid, 3-bromo-4-fluorocinnamic acid, 4-bromo-2-fluorocinnamic acid, 5-bromo-2-fluorocinnamic acid, 2-carboxycinnamic acid, 2-chlorocinnamic acid, 3-chlorocinnamic acid (cis), 4-chlorocinnamic acid (trans), 4-chloro-2-fluorocinnamic acid, trans-2-chloro-6-fluorocinnamic acid, trans-2,4-dichlorocinnamic acid, 3,4-dichlorocinnamic acid, trans-2,4-difluorocinnamic acid, trans-2,5-difluorocinnamic acid, trans-2,6-difluorocinnamic acid, trans-3,4-difluorocinnamic acid, trans-3,5-difluorocinnamic acid, 2,3-dimethoxycinnamic acid, 2,4-dimethoxycinnamic acid, 2,5-dimethoxycinnamic acid, 3,4-dimethoxycinnamic acid, 3,5-dimethoxycinnamic acid (trans), 3,5-dimethoxy-4-hydroxycinnamic acid, 4,5-dimethoxy-2-nitrocinnamic acid, α-ethyl-cis-cinnamic acid, α-fluorocinnamic acid, 2-fluorocinnamic acid, trans-3-fluorocinnamic acid, 4-fluorocinnamic acid, 4-formylcinnamic acid, 2-hydroxycinnamic acid, 3-hydroxycinnamic acid, 4-hydroxycinnamic acid, 3-hydroxy-4-methoxy-trans-cinnamic acid, 4-hydroxy-3-methoxy-trans-cinnamic acid, 4-isopropyl-trans-cinnamic acid, 2-methoxycinnamic acid, 3-methoxycinnamic acid (trans), 4-methoxycinnamic acid (trans), α-methylcinnamic acid, 3,4-(methylenedioxy)cinnamic acid, 4-methyl-3-nitrocinnamic acid, α-methyl-3-nitrocinnamic acid, α-methyl-4-nitrocinnamic acid, 2-nitrocinnamic acid, 3-nitrocinnamic acid (trans), 4-nitrocinnamic acid (trans), 2,3,4,5,6-pentafluorocinnamic acid, 2-(trifluoromethyl)cinnamic acid, 3-(trifluoromethyl)cinnamic acid, trans-4-(trifluoromethyl)cinnamic acid, 2,3,4-trifluorocinnamic acid, 3,4,5-trifluorocinnamic acid, 3,4,5-trimethoxycinnamic acid (trans), 2,4,6-trimethylcinnamic acid (cis), and their corresponding anhydride or salt.

The cationic monomers are also preferably water soluble, although cationic monomers that display little or no water solubility can also be used. Cationic monomers can be positively charged, or they can bear groups such as amines that are partially protonated in water to form ammonium groups. Preferred cationic monomers include unsaturated amines and unsaturated ammonium salts. Unsaturated cationic monomers may contain one, or more than one, carbon-carbon double bond.

Examples of suitable cationic monomers include allylamine, N-allylaniline, allylcyclohexylamine, allylcyclopentylamine, allylmethylamine, N-acryloyltris(hydroxymethyl)methylamine, N-tert-amyl-1,1-dimethylallylamine, N-tert-amyl-1,1-dimethylpropargylamine, diallylamine, 3,3'-diallyl-oxy-diisopropanolamine, 1,1-diethylpropargylamine, N-ethyl-2-methylallylamine, 3-ethynylaniline, 4-ethynylaniline, 1-ethynylcyclohexylamine, geranylamine, N-methylallylamine, propargyamine, vinylamine, 4-vinylaniline, 3-(acrylamidopropyl)trimethylammonium salt, [2-(acryloyloxy)ethyl](4-benzoylbenzyl)dimethylammonium salt, [2-(acryloyloxy)ethyl] trimethylammonium salt, 2-aminoethyl methacrylate hydrochloride, N-(3-aminopropyl)methacrylamide hydrochloride, diallyldimethylammonium salt, 2-(N,N-dimethylamino)ethyl acrylate dimethyl salt, 2-(N,N-dimethylamino)ethyl acrylate methyl salt, 2-(N,N-dimethylamino)ethyl methacrylate dimethyl salt, 2-(N,N-dimethylamino)ethyl methacrylate methyl salt, ethyl-3-amino-3-ethoxyacrylate hydrochloride, 4-ethynylpyridine hydrochloride, [3-(methacrylamido)propyl]trimethylammonium salt, [2-(methacryloyloxy)ethyl]trimethylammonium salt, propargyamine chloride, vinylbenzyltrimethylammonium salt, and N-2-vinyl-pyrrolidinone.

The molar ratio of anionic monomer to cationic monomer in the cross-linked copolymer is preferably in the range of from 95:5 to 5:95, more preferably in the range of from 1:9 to 1:1, and the ratio of anionic monomer to cationic monomer is particularly preferably in the range of 1:9 to 1:3. By changing the mole ratio of anionic monomer to cationic monomer, the performance of the composite membrane can be changed.

The anionic/cationic nature of the copolymer can also be obtained by using zwitterionic monomers to form the cross-linked copolymer. The zwitterionic monomers can bear both anionic and cationic groups, or they can bear groups that can be ionized to form negative and positive charges. Preferred zwitterionic monomers include unsaturated zwitterions or precursors thereof that can be readily converted to zwitterions. Unsaturated zwitterionic monomers may include one, or more than one, carbon-carbon double bond.

Examples of suitable zwitterionic monomers include 4-imidazoleacrylic acid, 4-aminocinnamic acid hydrochloride, 4-(dimethylamino)cinnamic acid, 1-(3-sulfopropyl)-2-vinylpyridinium hydroxide inner salt, 3-sulfopropyldimethyl-3-methacrylamidopropylammonium inner salt, and 5-amino-1,3-cyclohexadiene-1-carboxylic acid hydrochloride. Zwitterionic monomers can also be used in conjunction with an anionic monomer, with a cationic monomer, or with both.

While it is preferable that the support member be hydrophilic to facilitate the introduction of a charged cross-linked copolymer and to facilitate the passage of polar fluids, hydrophobic support members can also be utilized in certain situations, such as when a surfactant or a mixed solvent containing water and an organic solvent which wets the support are utilized. Materials that are suitable for making the hydrophilic support member include, for example, cellulose acetate (CA), poly(vinylidene floride) (PVDF), polysulfone (PS), polyethersulfone (PES), Nylon 6, poly(ethylene-co-vinyl alcohol) (EVAL) and poly(acrylonitrile) (PAN). Materials that are suitable for making a hydrophobic support member include, for example, polypropylene, poly(tetrafluoroethylene) (PTFE) and poly(vinylchloride) (PVC).

The average pore diameter of the support member can vary widely, but it preferably ranges from about 0.001 to about 20 microns, more preferably from about 0.002 to about 5 microns and particularly from about 0.005 to about 1 microns.

The porosity of the support member, which is a measure of the pore volume (also referred to as the void volume), is preferably from about 25 to about 95%, more preferably from about 45 to about 85% and particularly from about 0.60 to about 80%. Composite membranes prepared with support members having less than 25% porosity have very low fluxes, while support members with a porosity higher than 95% usually do not provide enough mechanical strength to anchor the copolymer. The porosity of the support member can be determined from the value of the bulk density of the porous support member and the density of polymer forming the support member, according to ASTM D-792.

The support member used in the invention is preferably either a symmetric porous membrane or an asymmetric porous membrane. Microfiltration membranes are suitable as symmetric porous membranes, and they preferably have a thickness of from about 10 to 300 microns, more preferably from about 20 to 150 microns and particularly from 50 to 120 microns. The thinner the support member, the higher the flux.

Figure 1B:
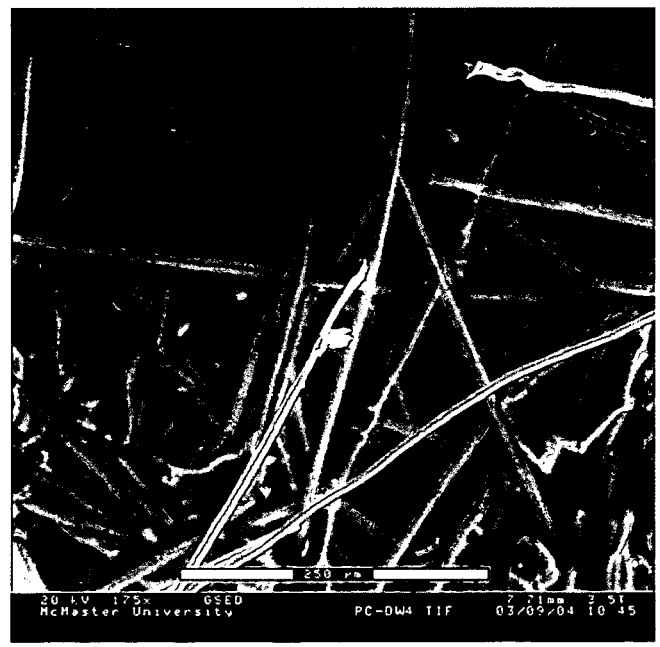

The asymmetric support member normally has a multi-layered nature, with a dense layer having smaller pores being supported on a backing layer that has larger pores. Ultrafiltration membranes are suitable for use as asymmetric support members. While these support members are described as having "layers", they only comprise a single continuous phase of a single polymer. The layers represent regions having different physical characteristics but the same chemical characteristics. The asymmetric membranes can also comprise non-woven materials (e.g. polyester) which act as mechanical strengthening materials. For asymmetric support members, the thickness of each layer is not critical, as long as sufficient mechanical rigidity is retained. With asymmetric support members, the cross-linked copolymer is substantially anchored within the pores of the dense layer, as shown in the SEM image of FIG. 1. Therefore, in asymmetric composite membranes, the void volume of the support member is not fully occupied by the cross-linked copolymer. In FIG. 1(a), the dense layer of a PAN asymmetric support member is completely filled with a cross-linked copolymer. FIG. 1(b) shows that while the more porous layer of the asymmetric PAN-based membrane has some dispersed copolymer within its pores, most of the space is free of copolymer. When the composite membrane of the invention is prepared with an asymmetric support member, the thickness of the dense layer determines the flux of the membranes. It has been observed that asymmetrically filled composite membranes, such as those obtained using ultrafiltration membranes as the support member, lead to pervaporation membranes having higher fluxes.

Asymmetric composite membranes can also be prepared with symmetric support members, by asymmetrically filling the pores of the support member with the cross-linked copolymer. Such asymmetric composite membranes can be prepared by initiating the cross-linking reaction on a single side of the support member, thus obtaining unequal distribution of cross-linked copolymer through the thickness of the support member. It is also possible to obtain an asymmetrically filled membrane by only partially filling the support member with the solution containing the monomers and initiator.

The composite membranes of the present invention can be prepared by polymerizing and cross-linking a mixture of negatively charged (anionic) and positively charged (cationic) monomers into the pores of porous symmetric (microfiltration) or asymmetric (ultrafiltration) support members.

Preferably, the composite membranes are prepared through water-based chemical reactions, although the composite membranes can also be prepared using mixtures of water and organic solvents. Typically, a solution comprising both positively and negatively charged monomers, a cross-linker and an initiator are introduced into the pores of a porous support member and anchored in place by polymerization within the pores using a free radical polymerization process.

Preferably, in situ polymerization and cross-linking occur simultaneously when preparing the composite materials. The function of cross-linking is to control and modulate conformation flexibility of the cross-linked copolymer. The cross-linkers used in the invention preferably have at least two unsaturated groups to form a three dimensional cross-linked structure with the cationic/anionic copolymer. While water soluble cross-linking agents are preferred, cross-linking agents that display little or no solubility in water can also be used. Examples of suitable cross-linkers include 3-(acryloyloxy)-2-hydroxypropyl methacrylate, allyl diglycol carbonate, bis(2-methacryloxyethyl) phosphate, 2,2-bis(4-methacryloxyphenyl)propane, 2,2-bis[4-(2-acryloxyethoxy)phenyl]propane, 2,2-bis[4-(2-hydroxy-3-methacryloxypropoxy)phenyl]propane, 1,4-butanediol diacrylate, 1,3-butanediol dimethacrylate, 1,4-butanediol dimethacrylate, cinnamyl methacrylate, 2-cinnamoyloxyethyl acrylate, trans-1,4-cyclohexanediol dimethacrylate, 1,10-decanediol dimethacrylate, N,N'-diallylacrylamide, diallyl carbonate, diallyl maleate, diallyl phthalate, diallyl pyrocarbonate, diallyl succinate, 1,3-diallylurea, 1,4-diacryloylpiperazine, diethylene glycol diacrylate, diethylene glycol dimethacrylate, diethylene glycol divinyl ether, 2,2-dimethylpropanediol dimethacrylate, dipropylene glycol dimethacrylate, divinyl glycol, divinyl sebacate, divinylbenzene, N,N'-ethylene bisacrylamide, ethylene glycol diacrylate, ethylene glycol dimethacrylate, 1,6-hexanediol diacrylate, 1,6-hexanediol dimethacrylate, N,N'-hexamethylenebisacrylamide, N,N'-methylenebismethacrylamide, 1,9-nonanediol dimethacrylate, pentaerythritol tetraacrylate, pentaerythritol triacrylate, pentaerythritol triallyl ether, 1,5-pentanediol dimethacrylate, 1,4-phenylene diacrylate, tetraethylene glycol dimethacrylate, triallyl cyanurate, triethylene glycol diacrylate, triethylene glycol dimethacrylate, triethylene glycol divinyl ether, 1,1,1-trimethylolpropane diallyl ether, 1,1,1-trimethylolpropane triacrylate, and 1,1,1-trimethylolpropane trimethacrylate. Preferably, the amount of cross-linking agent is from 0.1% to 25%, more preferably from 0.5% to 20%, and particularly preferably from 1.0% to 15%, based on the total molar amount of monomers.

In situ polymerization of cationic/anionic monomers in the pores of the porous support member can be initiated by free radical polymerization procedures. Such free radical polymerization includes initiation of the polymerization by photo initiation, thermal initiation or redox initiation. The initiator used in this invention is preferably water soluble, and any water soluble thermal and/or photo initiator can be used. The amount of initiator used is generally from about 0.01% to about 3.0%, preferably from about 0.1% to about 2.5%, and particularly preferably from about 0.2% to about 2.0% of the amount of total monomers by weight.

The pore-filled membranes of this invention may be utilized in various configurations, such as plate-and-frame configuration, spiral wound configuration, and tubular or hollow fibre configuration.

The novel composite membranes of the invention may be particularly useful in pervaporation process for dehydration aqueous mixtures of organic solvents. It is also possible to utilize composite membranes of the invention to remove water from immiscible or partially miscible mixtures by pervaporation. In addition, the composite membranes may be particularly useful for separating azeotropes.

Examples of organic solvents that can be dehydrated by composite membranes of this invention include alcohols, glycols, weak acids, ethers, esters, ketones, aldehydes, amides, liquid hydrocarbons and their derivations, and aromatic hydracarbons. Said alcohols may include ethanol, propanol, i-propanol, n-butanol, i-butanol, t-butanol, amyl alcohols, and hexyl alcohols. Said glycols may include ethylene glycol, propylene glycol, butylene glycol or glycol ethers such as diethylene glycol, triethylene glycol, or triols, including glycerine. Said weak acids may include acetic acid, propionic acid, lactic acid, malonic acid, butyric acid, succinic acid, valeric acid, and caproic acid. Said esters may include methyl acetate, ethyl acetate, i-propyl acetate, n-butyl acetate, i-butyl acetate, n-amyl acetate, i-amyl acetate, methyl formate, ethyl formate, benzyl formate, methyl benzonate, ethylene glycol mono acetate, and propylene glycol monostearate. Said ethers may include tetrahydroforan, diethyl ether, dipropyl ether, diisopropyl ether, and ethyl propyl ether. Said ketones may include acetone, butanone, methyl ethyl ketone (MEK), 2-pentanone, 3-pentanone, methyl isobutyl ketone, 1,3-dioxolane, acetonylacetone, acetylacetone, and acetophenone. Said aldehydes may include formaldehyde, acetaldehyde, and propionaldehyde. Said amides may include N,N'-dimethylformamide, and N,N'-dimethylacetamide. Said liquid hydrocarbons may include heptane, hexane, cyclohexane, heptane, and octane. Said liquid hydrocarbons derivations may include dichloroethane, methylene dichloride, dichloropropane, ethylenediamine, diethylamine, isopropylamine, thiethylamine, acetonitrile, propionitrile, and butyronitrile. Said aromatic hydrocarbons may include benzene, toluene, ethylbenzene, and xylenes. Good results can be achieved when treating solvents having more than two carbons. Solvents having less than three carbons, such as methanol, ethanol, ethylene glycol, can still be dehydrated, but with a somewhat lower selectivity. Understandably, the organic solvents treated should be inert with respect to membranes of this invention.

Aqueous organic solutions treated by composite membranes of the invention may contain 1-99.9 wt. % water. It is more economical when mixtures containing less than 50 wt. % water are treated, and it is especially practical when mixtures are in azeotropic composition or containing less than 20 wt. % water.

Composite membranes of the invention can also be used to separate alcohol/non-polar or alcohol/polar mixtures. Suitable non-polar organic mixtures include 2,2,3-trimethylbutane, 2,2-dimethylpentane, 2,3-dimethylpentane, 2,4-dimethylpentane, 3,3-dimethylpentane, 2-methylpetane, 3-methylpetane, hexane, 2-methylhexane, 3-methylhexane, 2,2-dimethylhexane, 2,4-dimethylhexane, 2,5-dimethylhexane, 3,4-dimethylhexane, cyclohexane, heptane, 2-methylheptane, 3-methylheptane, 4-methylheptane, octane, benzene, ethylbenzene, toluene, and xylenes. Suitable alcohol/polar mixtures includes methanol/isopropanol, methanol/dimethyl carbonate (DMC), methanol/methyl tert-butyl ether (MTBE), and methanol/tert-amyl methyl ether (TAME).

In the pervaporation process of this invention, a solution to be treated is typically kept at 40° C.-120° C., for example at 80° C., and passed into contact with a composite membrane of the invention. Typically, the composite membrane of the invention retains both high flux and selectivity values at high operation temperatures. When the composite membrane is asymmetrically filled with the cross-linked copolymer, the side of the membrane having a larger amount of cross-linked copolymer is contacted with the solution. A pressure drop of about one atmosphere is commonly maintained across the composite membrane. Typically, the feed side of the composite membrane is kept at about atmospheric pressure and the permeate side is kept at a pressure of 0.1-60 mbar, preferably at a pressure of 2-20 mbar, and more preferably at a pressure of 10 mbar. The fluid retrieved on the permeate side of the composite membrane mostly comprises the polar component of the solution, and it also includes a small portion of the less polar component of the solution. Typically, the permeate contains 80-99.99 wt. % of the polar component. When the less polar solution component is an organic solvent that contains more than two carbons and the polar component is water, the permeate usually contains 95-99.99 wt. % water.

Composite membranes of the invention can be incorporated into reactors to remove water by-products. In some reactions, such as reversible reactions, the water that is produced decreases the reaction rate and inhibits the completion of the reaction. In order to drive the reaction to completion efficiently and economically, water has to be removed from the reaction vessel while the reaction is taking place. This can be achieved by combining a composite membrane of the invention with a reactor. By continuously removing water from the reactor with a composite membrane of the invention, the reaction rate can be increased and the reaction can be driven to completion.

EXAMPLES

The following examples are provided to illustrate the invention. It will be understood, however, that the specific details given in each example have been selected for purpose of illustration and are not to be construed as limiting the scope of the invention. Generally, the experiments were conducted under similar conditions unless noted.

In the specific examples that follow, the CA support member was obtained from Advantec MFS, Inc.; the CA Plus support member was obtained from GE Osmonics Inc.; the EVAL support member was obtained from 3M Company; the Nylon support member was obtained from Cole-Parmer company; the PAN support member was obtained from GMT membrantecknic Germany; and the PVDF support member is a microfiltration membrane obtained from Millpore Inc. The Irgacure 2959 photo initiator was obtained from Ciba speciality Chemicals Inc., and all other chemicals employed in the examples were obtained from the Aldrich Chemical Company.

Figure 2:
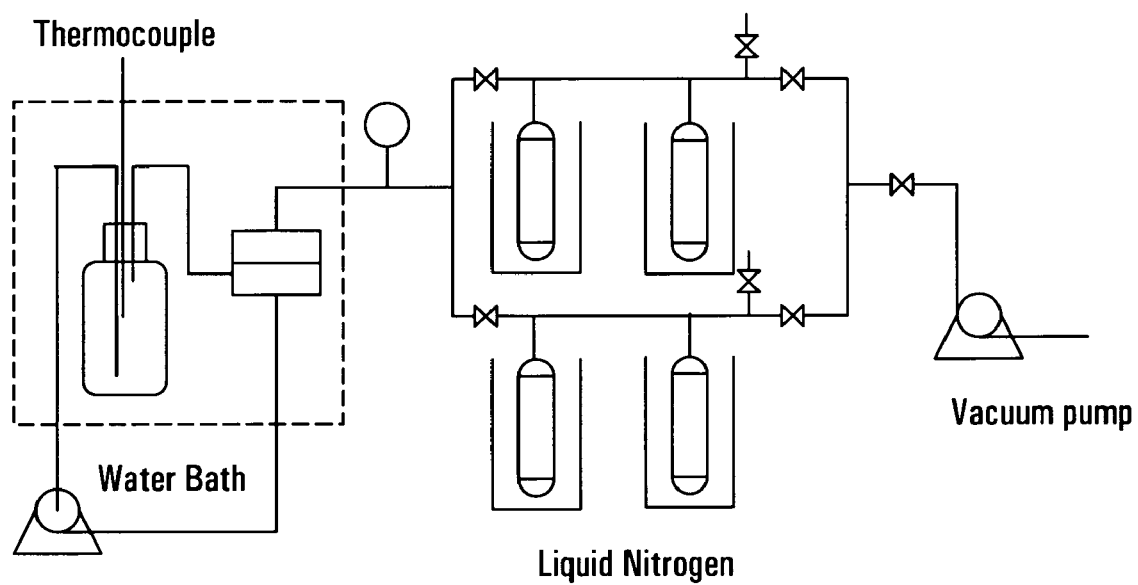
FIG. 2 is a schematic diagram of the pervaporation apparatus used in the examples.

A schematic diagram of a pervaporation apparatus used in the examples is shown in FIG. 2. The feed solution temperature is controlled by a water bath and the feed solution is circulated to the surface of the membrane by use of a pump. The support membrane is placed and sealed on a porous aluminum support of a stainless steel pervaporation cell. The effective membrane area was 21.40 $cm^2$. The pressure of the permeate side was kept below 5 mbar with a vacuum pump. The permeate was collected in a liquid nitrogen cold trap. Two parallel permeate lines were used to collect the permeate samples so that the pervaporation apparatus can operate continuously. The pervaporation apparatus was run for at least 1 hr to reach an equilibrium state before starting to collect permeate sample. Once sufficient permeate sample was collected, the sample line was switched to the parallel line to continue collecting sample, the collected permeate was warmed to room temperature, it was weighed and its composition was analyzed using a Varian 3800 Gas Chromatograph.

Example 1

This example illustrates the preparation of composite membranes of the invention using either a thermal- or a photo-initiated method.

Thermally-Initiated In Situ Polymerization:

In this example, the anionic monomer used was methacrylic acid, sodium salt (MAAS), the cationic monomer was diallyldimethyl ammonium chloride (DADMAC). The mole ratio of DADMAC/MAAS was 4:1. The cross-linker used was N,N'-methylenebisacrylamide (MBAA), the amount of MBAA used was 3% based on the total molar amount of monomers. Ammonium persulfate was used as the thermal initiator, its amount was 1.0% of the total weight of monomers. Mixing the above chemicals and diluting them to 50% monomers concentration, stirring the mixture for 0.5-2 hrs till all solids are dissolved in water. After filtration to remove any undissolved solid by filter paper, the mixture was ready to prepare the membrane.

A CA microfiltration membrane with a pore size of 0.8 μm and a porosity of 72% was used as support member. After immersed the CA support member into the prepared monomers solution for 2 to 10 minutes to fill pores with the solution, the wetted support member was sandwiched with two polyethylene films. Other films, such as polypropylene or polyester, can also be used to sandwich the wetted support member. After removing the excess solution by gentle application of a roller, the sandwiched membrane was put into an oven at 60° C., for between 0.5 to 1 hour, until the polymerization reaction finished.

Photo-Initiated In Situ Polymerization:

In this example, the monomers solution was prepared in the same procedure as in the thermal method except that the photo initiator Irgacure 2959 was used instead of a thermal initiator.

The same type of CA microfiltration membrane was used as support member. After wetted and sandwiched the support member, the sandwiched membrane was put into UV chamber for 0.5-2.0 hr to irradiate the reaction. The wavelength of the UV used was around 350 nm.

In each preparation procedure, after removing the two sandwich layers, unbound homopolymer was removed from membranes by exaction with distilled water until no further mass loss occurred. Then the membrane was dried in the air.

These two membranes were tested in pervaporation experiments with 92.0 wt. % IPA/water at 60° C. The thermal prepared membrane has a flux of 0.49 $Kg/m^2$ hr and the permeate contains 97.0 wt. % water; the flux of the photo prepared membrane is 0.47 $Kg/m^2$ hr and the water content in the permeate is 98.0 wt. %.

Example 2

This example illustrates the use of an asymmetric membrane as support member to prepare pervaporation membrane of this invention.

In this example, A PAN HV1,1/T ultrafiltration asymmetric membrane was used as support member, its mean pore size is 0.0246 microns as specified by the provider. The cationic monomer was [2-(methacryloxy)ethyl]trimethylammonium chloride (MAETAC), the anionic monomer was methacrylic acid (MAA). Their mole ratio was 4:1. MBAA was used as cross-linker, its amount was 3% of the total moles of monomers. Photo initiator Irgacure 2959 was taken, its amount was 0.5% of the total weight of monomers. The concentration of the monomers in the solution was 60 wt. %. The membrane was prepared in accordance with example 1 using the photo-initiated method.

When dealing with 89.2% IPA/water at 75° C. in pervaporation test, the membrane has a flux of 2.35 $Kg/m^2$ hr and the permeation water content is 97.0 wt. %.

Example 3

This example demonstrates the effect of anion/cation mole ratio on the performance of pore-filled membranes.

A series of membranes were prepared with different anion/cation mole ratio. The anionic and cationic monomers were MAA and 3-(acrylamidopropyl)trimethylammonium chloride (APTAC), respectively. Six anion/cation mole ratio, i.e., 0:100, 20:80, 40:60, 60:40, 80:20, 100:0, were used. The total concentration of the monomers in solution was 65 wt. %. All other conditions were the same as example 1 using the photo-initiated polymerization method.

Figure 3:
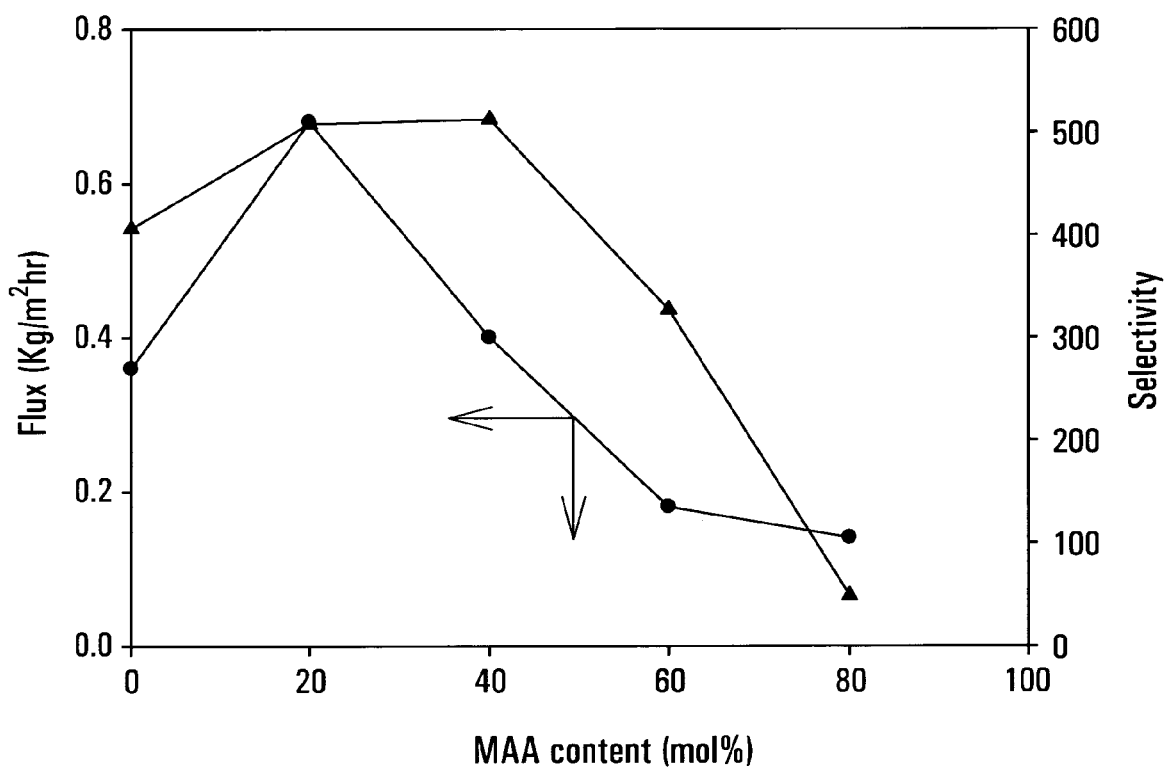
FIG. 3 is a graph illustrating the effect of anionic/cationic monomer ratio on the pervaporation performance of pore-filled membranes with 90.9 wt. % IPA/water at 60° C. The anionic monomer is methacrylic acid (MAA), and the cationic monomer is 3-(acrylamidopropyl)trimethylammonium chloride (APTAC).

These membrane were tested with 90.9 wt. % IPA/water and the results are shown in FIG. 3. In the whole mixture range, anion/cation copolymer filled membranes have both higher flux and higher selectivity than MAA filled membranes. When the cation content in monomer solutions higher than 50 mol. %, the flux and selectivity of prepared membranes are higher than those of only anion or cation filled membranes.

Example 4

This example demonstrates the effect of anionic monomer on the performance of pore-filled membranes.

A series of membranes were made in this example with different anionic monomers while using APTAC as cationic comonomer. Used anionic monomers include acrylic acid (AA), MAA, MAAS, 2-acryamido-2-methyl-1-propane-sulfonic acid (AMPS), 4-styrene sulfonic acid, sodium salt (SSAS). The blank example means the membrane was prepared only with APTAC anionic monomer, and there was no cationic monomer used. The mole ratio of cation/anion was 4:1, and their total concentration was 65 wt. %. The cross-linker was MBAA and the cross-linking degree was 5 mol. % of total monomers. All other preparation conditions were the same as described in example 1 using the photo-initiated method.

Figure 4:
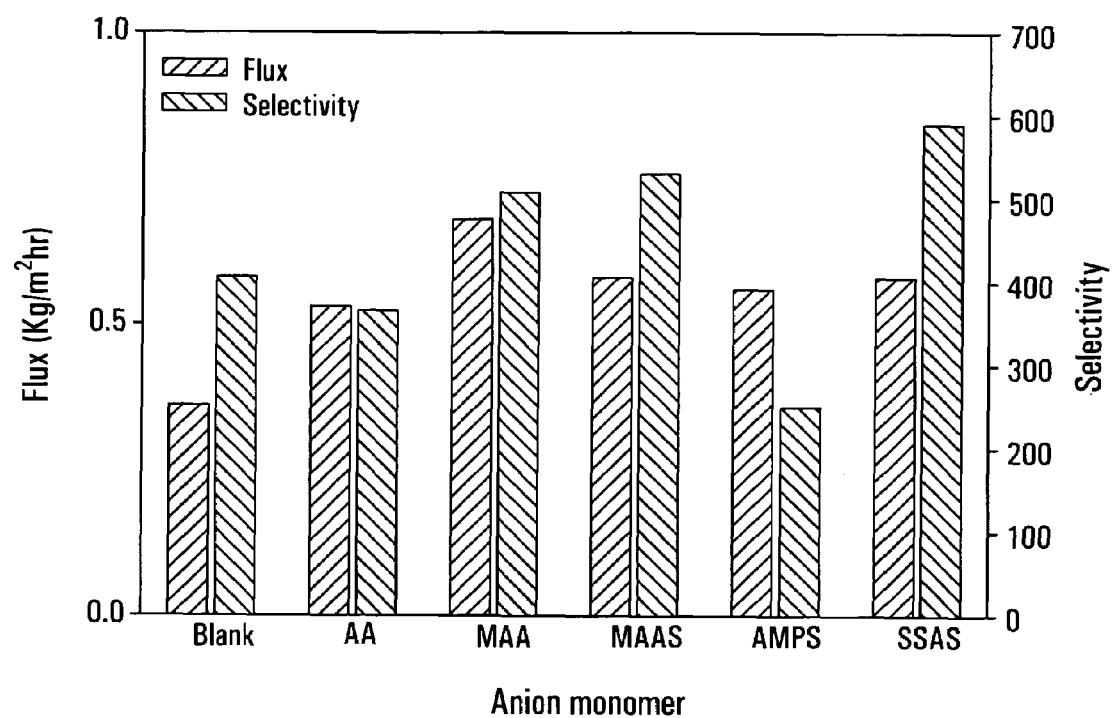
FIG. 4 is a graph illustrating the performance of composite membranes as a function of anionic monomer with APTAC comonomer during pervaporation with 91.6 wt. % IPA/water at 60° C. AA: acrylic acid; MAA: methacrylic acid; MAAS: methacrylic acid, sodium salt; AMPS: 2-acryamido-2-methyl-1-propanesulfonic acid; SSAS: 4-styrene sulfonic acid, sodium salt.

The pervaporation performance of this series membranes were tested with 91.6 wt. % IPA water at 60° C. The results are shown in FIG. 4. By changing anionic monomers, the hydrophilicity of anionic/cationic copolymer changes, and thus the pervaporation performance of prepared membranes were changed.

Example 5

This example demonstrates the effect of cationic monomer on the performance of pore-filled membranes.

In this example, MAA was used as anionic monomer, while the cationic was APTAC, [2-(acryloyloxy)ethyl]trimethylammonium chloride (AETAC) and MAETAC respectively. Similar to example 4, the Blank membrane means the membrane prepared with only MAA anionic monomer. The support member was EVAL, which has a pore size of 0.28 μm and a porosity of 48%. All other preparation conditions were the same as in example 1 using the photo polymerization method except the total concentration of monomers was 65 wt. % and the amount of initiator was 0.5% of the total monomers weight.

Figure 5:
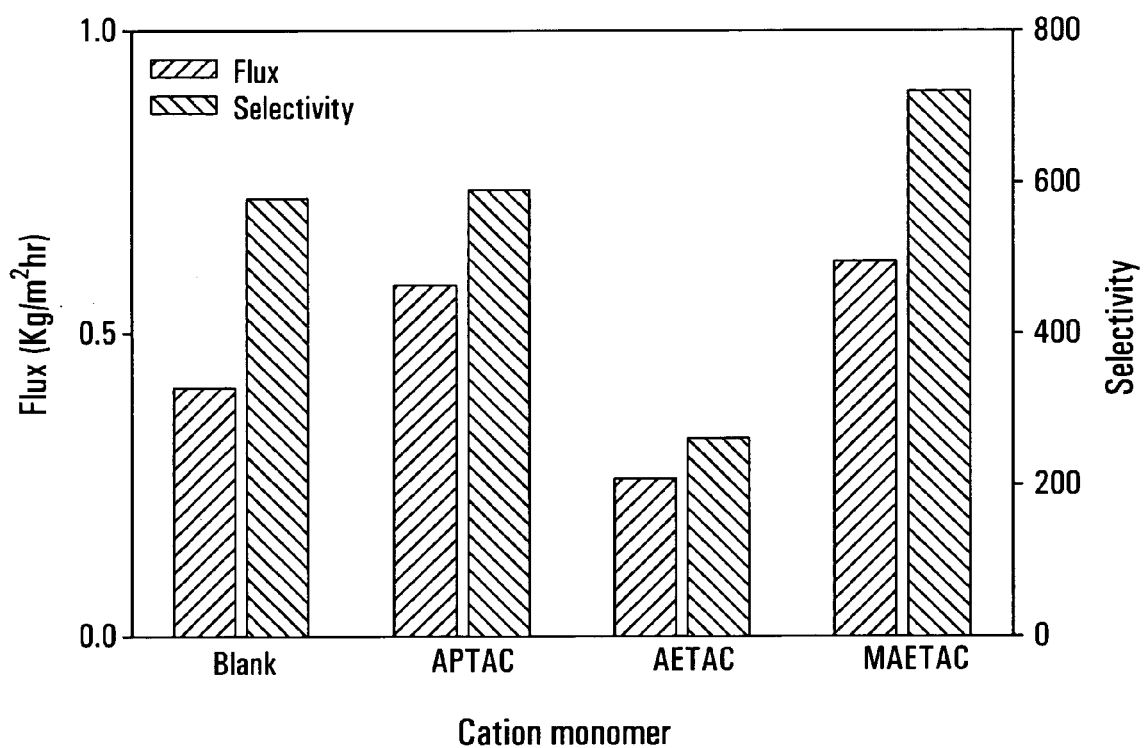
FIG. 5 is a graph illustrating performance of composite membranes as a function of cationic monomer with SSAS comonomer during pervaporation with 89.9 wt. % IPA/water at 60° C. APTAC: 3-(acrylamidopropyl) trimethylammonium chloride; AETAC: [2-(acryloyloxy)ethyl]trimethylammonium chloride; MAETAC: [2-(methacryloyloxy)ethyl]trimethylammonium chloride.

FIG. 5 shows the pervaporation results of this series of membranes with 89.9 wt % IPA/water at 60° C. The performance of membranes was changed with different cationic monomers due to the change of the hydrophilicity of the copolymer. Combined this example with example 4, it can be concluded that cation/anion pore-filled membranes have a tunable pervaporation performance, and it is easy changed by changing the anion or cation in copolymers.

Example 6

In this example, different hydrophilic support members were used to show the effect of support members on the performance of cationic/anionic pore-filled membranes.

Two series of membranes were prepared. APTAC and MAA were used as cationic and anionic monomers in the first series of experiments. Their total concentration was 65 wt. % and their mole ratio was 4:1. Four support members, CA (0.2 μm), CA (0.8 μm), EVAL and PVDF, were used to prepare membranes. All other membrane fabrication conditions were the same as in example 1 using the photo-initiated method. Properties of four support members and the performance of prepared membranes with these support members at 60° C. are shown in Table 1. It can be seen that support members have a great influence on the performance of cationic/anionic pore-filled membranes. The larger the porosity of the support member, the higher the flux of the corresponding pore-filled pervaporation membrane.

TABLE 1

Performance of pore-filled membranes with different support members

| Substrate | Pore size (μm) | Porosity (%) | $C_{IPA}$ (wt. %) Feed | $C_{IPA}$ (wt. %) Perm | Flux Kg/m²hr | Selectivity |
|---|---|---|---|---|---|---|
| CA | 0.2 | 66 | 90.7 | 2.57 | 0.63 | 380 |
| CA | 0.8 | 72 | 90.6 | 1.94 | 0.68 | 508 |
| EVAL | 0.2 | 48 | 90.1 | 3.86 | 0.34 | 253 |
| PVDF | 0.22 | 56 | 91.6 | 6.01 | 0.47 | 157 |

In the second series of experiments, MAETAC and MAA (mole ratio 4:1) were used as cationic and anionic monomers, and their total concentration was 65 wt. %. Five support members, CA (0.2 μm), CA (0.8 μm), CA Plus, EVAL and PAN, were used to prepare membranes. Except that the amount of the initiator was 0.5 wt % of the total monomers weight, all other membrane fabrication conditions were the same as in example 1 using the photo-initiated method. Properties of these support members and the performance of corresponding prepared membranes are shown in Table 2. Among these membranes, the membrane prepared with PAN support member has the highest flux, and the membrane fabricated with CA support member of 0.8 μm pore size has the highest selectivity.

TABLE 2

Performance of pore-filled membranes with different support members

| Substrate | Pore size (μm) | Porosity (%) | T (° C.) | $C_{IPA}$ (wt. %) Feed | $C_{IPA}$ (wt. %) Perm | Flux Kg/m²hr | Selectivity |
|---|---|---|---|---|---|---|---|
| CA | 0.2 | 66 | 60 | 91.0 | 3.08 | 0.41 | 318 |
| CA | 0.8 | 72 | 60 | 93.3 | 1.12 | 0.52 | 1240 |
| CA Plus | 0.22 | 50 | 60 | 90.3 | 2.09 | 0.39 | 436 |
| EVAL | 0.2 | 48 | 60 | 90.9 | 1.44 | 0.37 | 684 |
| PAN | 0.025 | — | 75 | 89.2 | 3.03 | 2.35 | 260 |

These two series of experiments show that the pervaporation performance of cationic/anionic copolymer pore-filled membrane is greatly affected by the support member. The larger the porosity of the support member, the higher the flux of the corresponding pore-filled pervaporation membrane. For PAN asymmetric support member, cationic/anionic copolymer were mainly anchored into the thin PAN layer, as shown in FIG. 1, therefore, the corresponding membrane has extremely high flux.

Example 7

This example shows the effect of temperature on pervaporation performance of anion/cation pore-filled membrane.

A CA microfiltration membrane, which has a pore size of 0.2 μm and porosity of 66%, was used in this example. The anionic and cationic monomers used were MAA and APTAC respectively, their concentration was 65 wt. % and their mole ratio was 1:4. Other membrane preparation conditions were the same as in example 1 using the photo-initiated method.

Figure 6:
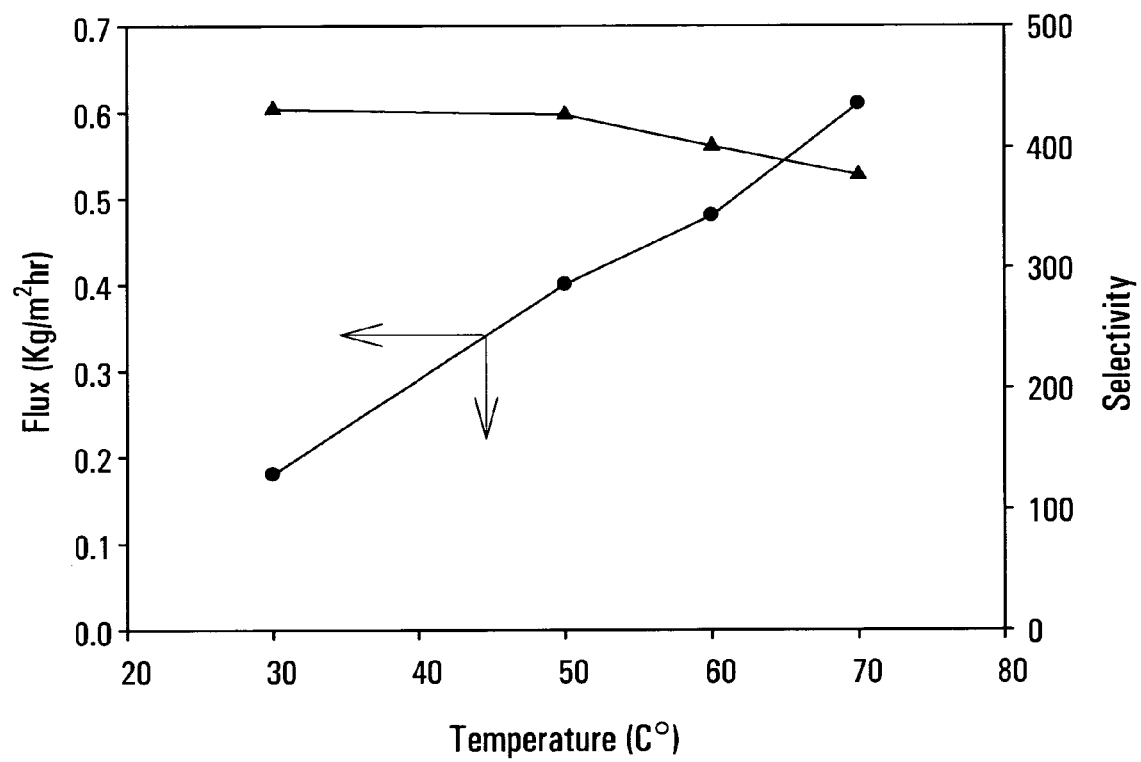
FIG. 6 is a graph illustrating the performance of an APTAC/MAA (mole ratio 4:1) copolymer filled composite membrane as a function of temperature during pervaporation with 91.2 wt. % IPA/water.

The pervaporation characteristics of the prepared membrane was tested at different temperatures with 91.2 wt. % IPA/water, and the results are shown in FIG. 6. The flux was increased sharply with the temperature, the flux at 70° C. are more than 2 times higher than that at 30° C. At the same time, the selectivity of the membrane only decreases a little. This means anionic/cationic copolymer membranes can have both higher flux and higher selectivity at higher operation temperature, which is an advantage of this invention.

Example 8

This example shows the effect of IPA feed concentrations on pervaporation performance of anion/cation pore-filled membrane.

A CA microfiltration membrane, which has a pore size of 0.2 μm and porosity of 66%, was used in this example. The anionic and cationic monomer used were AA and APTAC respectively, their concentration was 65 wt. % and their mole ratio was 1:9. The other membrane preparation conditions were the same as in Example 1 using the photo-initiated method.

Figure 7:
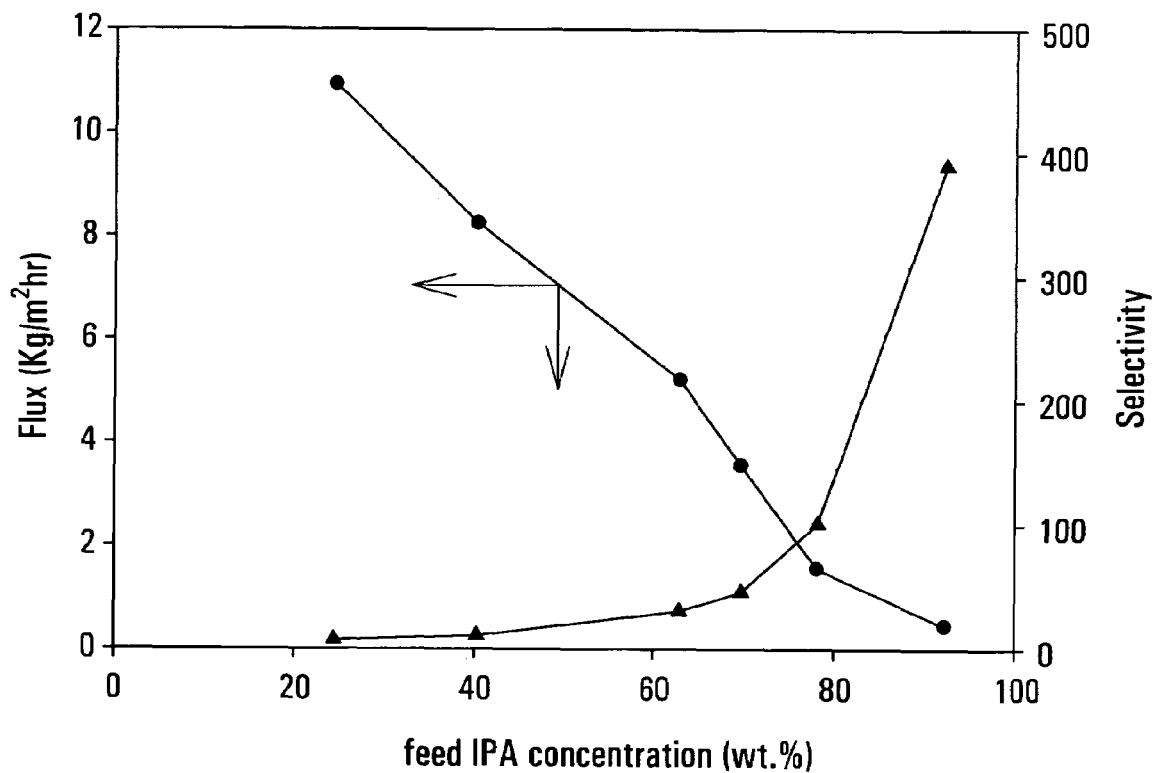
FIG. 7 is a graph illustrating the performance of an APTAC/AA (mole ratio 9:1) copolymer filled composite membrane as a function of IPA feed concentration during pervaporation with IPA/water at 60° C.

The pervaporation characteristics of the prepared membrane were measured with different IPA/water concentrations at 60° C., and the results are shown in FIG. 7. With the increase of IPA feed concentration, the flux decreases and the selectivity increases. At all the tested feed concentrations, the water content in the permeate was higher than 95 wt. %. After all the tests, the dimension of the membrane was changed by less than 2%, and the membrane still can be used to dehydrate organic solvents. However, many commercial membranes cannot be used after dealing with mixtures of higher water content.

Example 9

This example shows the performance of anionic/cationic pore-filled membranes when treating higher IPA feed concentrations.

A PAN HV1,1/T ultrafiltration asymmetric membrane was used as support member in this example. The anionic and cationic monomer used were MAA and MAETAC respectively, their concentration was 68 wt. % and their mole ratio was 1:4. The other membrane preparation conditions were the same as in Example 1 using the photo-initiated method.

The experimental results are listed in Table 3. It shows that the permeate IPA concentration of the membrane is still below 5 wt. % even when the feed IPA concentration is as high as 98.5%. In the mean time, the flux of the membrane is still relative high.

TABLE 3

Performance of membranes at higher IPA concentration at 80° C.

| IPA concentration (wt. %) | | Flux |
|---|---|---|
| Feed | Permeate | (Kg/m²hr) |
| 96.0 | 0.59 | 0.40 |
| 96.3 | 1.11 | 0.34 |
| 97.6 | 1.77 | 0.20 |

TABLE 3-continued

Performance of membranes at higher IPA concentration at 80° C.

| IPA concentration (wt. %) | | Flux |
|---|---|---|
| Feed | Permeate | (Kg/m²hr) |
| 98.0 | 2.57 | 0.18 |
| 98.3 | 4.35 | 0.15 |

Example 10

In this example, the pervaporation performance of anionic/cationic pore-filled membranes is compared with those of several commercial available membranes, the tested system is IPA/water.

The membrane of this invention was prepared with PAN support member. The anionic and cationic monomers were MAA and MAETAC (mole ratio 1:4) respectively, and their concentration was 60 wt. %. The amount of initiator was 0.5 wt. % of the total monomers weight, all other fabrication conditions were the same as in example 1 using the photo irradiation method. GFT 2216 and Sulzer 1702w are two commercialized pervaporation membranes. The performance of these three membranes was tested, and the results are shown in Table 4. The results show that the flux of the membrane of this invention is at least 5.5 times higher than those of two commercialized membranes, while all membranes have similar selectivities.

TABLE 4

Performance comparison of different pervaporation membranes

| Membrane | T (° C.) | IPA Concentration (wt. %) | | Flux (Kg/m² hr) |
|---|---|---|---|---|
| | | Feed | Permeate | |
| GFT 2216 | 75 | 89.6 | 0.96 | 0.24 |
| Sulzer 1702w | 75 | 91.0 | 0.81 | 0.28 |
| This invention | 75 | 91.5 | 1.17 | 1.81 |

Example 11

In this example, the pervaporation performance of anionic/cationic pore-filled membranes is compared with those of several commercial available membranes with published performance data.

Three organic solvents system, Methyl ethyl ketone (MEK)/water, Acetone/water and IPA/water, were tested by pervaporation experiments. The anionic and cationic monomers used in this example were MAA and MAETAC (mole ratio 1:4) respectively, and their concentration was 65 wt. %. Except that the support member was EVAL, all other conditions were the same as in example 1 using the photo-initiated method. The performance of the membrane of this invention was measured and the comparison is shown in Table 5. In Table 5, data of membrane GFT[1] was from patent EP 0,381,477, data of membrane GFT[2] was published in patent U.S. Pat. No. 4,755,299. The results show that the performance of the cationic/anionic copolymer pore-filled membrane of this invention is superior to those two commercial membranes.

TABLE 5

Performance comparison of different pervaporation membranes

| Membrane | Solvents | T (° C.) | Feed water content (%) | Flux (Kg/m²hr) | Selectivity |
|---|---|---|---|---|---|
| GFT[1] | MEK | 60 | 0.75 | 0.04 | 16 |
| Present invention | MEK | 60 | 1.3 | 0.03 | 31800 |
| GFT[1] | Acetone | 50 | 2.01 | 0.04 | 6 |
| Present invention | Acetone | 50 | 1.20 | 0.05 | 1600 |
| GFT[2] | IPA | 45 | 20 | 0.30 | 250 |
| Present invention | IPA | 45 | 20 | 0.60 | 633 |

Note:
Data of membrane GFT[1] was from patent EP 0,381,477, data of membrane GFT[2] was published in patent U.S. Pat. No. 4,755,299.

Example 12

In this example, an anionic/cationic pore-filled membrane is used for the pervaporation dehydration of ethanol/water mixture.

The membrane tested in example 10 was used in this example. The membrane was used to dehydration 92.1 wt. % ethanol at 70° C. It has a flux of 0.40 Kg/m² hr and the permeate has a water content of 79.0 wt. %.

Example 13

In this example, an anionic/cationic pore-filled membrane is used in the pervaporation dehydration of ethylene glycol (EG)/water mixture.

The anionic and cationic monomers used in this example were MAA and MAETAC (mole ratio 1:4) respectively, and their concentration was 65 wt. %. The support member was EVAL. Except the amount of initiator was 0.5 wt. % of the total monomers weight, all other conditions were the same as in example 1 using the photo-initiated method. The prepared membrane was used to dehydration 89.1 wt. % EG at 70° C. It has a flux of 0.55 Kg/m² hr and the permeate has a water content of 76.7 wt. %.

Example 14

In this example, an anionic/cationic pore filled membrane is used in the pervaporation dehydration of other organic solvents/water mixtures at 60° C.

The membrane in example 10 was used in this example. The experimental results are shown in Table 6. For organic solvents having more than two carbons, cationic/anionic copolymer pore-filled membranes have both high fluxes and high selectivities. For acetic acid, the membrane has high flux.

TABLE 6

Pervaporation dehydration of solvents by anionic/cationic pore-filled membrane

| Solvent | Feed water content (%) | Permeate water content (%) | Flux (Kg/m²hr) | Selectivity |
|---|---|---|---|---|
| t-butanol | 10.9 | —* | 0.64 | >40000 |
| MEK | 9.2 | 99.94 | 2.06 | 14100 |

TABLE 6-continued

Pervaporation dehydration of solvents by anionic/cationic pore-filled membrane

| Solvent | Feed water content (%) | Permeate water content (%) | Flux (Kg/m²hr) | Selectivity |
|---|---|---|---|---|
| Acetic acid | 11.4 | 43.4 | 2.78 | 6.0 |
| Acetone | 24.5 | 97.7 | 1.70 | 133 |

*no t-butanol was detected in the permeate.

Example 15

In this example, an anionic/cationic pore-filled membrane is used in the pervaporation separation of other methanol/organic solvent mixtures.

The anionic and cationic monomers used in this example were Itaconic acid (IA) and MAETAC (mole ratio 1:4), the support member was EVAL. Except the total monomers concentration was 55 wt. %, all other conditions were the same as in example 1 using the photo-initiated method. The prepared membrane was used to separate methanol/MTBE and methanol/toluene at 60° C., and the results are shown in Table 7. The results show that the pore-filled membrane has good permselectivity to methanol.

TABLE 7

Pervaporation separation of methanol/solvents by pore-filled membrane

| Solvent | Feed methanol content (%) | Permeate methanol content (%) | Flux (g/m²hr) | Selectivity |
|---|---|---|---|---|
| MTBE | 10.5 | 98.6 | 18.8 | 605 |
| Toluene | 11.0 | 98.0 | 54 | 396 |

Example 16

In this example, the scale-up of pore-filled membranes was investigated.

The anionic and cationic monomers used in this example were MAA and MAETAC (more ration 1:4) respectively, and their concentration was 60 wt. %. The amount of initiator was 0.5 wt % of total monomers weight. All other fabrication conditions were the same as in example 1 using the photo-initiated method. A 60 cm disk membrane was made by this method. Three random parts of the big disk membrane were cut and their performance was measured. The experimental results were shown in Table 8. It can be seen in Table 8 that these three parts have similar flux and selectivity, which demonstrate unequivocally that the 60 cm membrane is homogeneous. Therefore, there are no scale-up problems in making these anion/cation pore-filled membranes.

TABLE 8

Reproducibility of Pore-filled membranes

| Part | T (°C.) | IPA concentration (wt. %) | | Flux (Kg/m²hr) |
| --- | --- | --- | --- | --- |
| | | Feed | permeate | |
| A | 75 | 90.0 | 3.04 | 1.78 |
| B | 75 | 91.9 | 3.85 | 1.82 |
| C | 75 | 91.4 | 3.50 | 1.68 |

Example 17

Besides flux and selectivity, durability or stability is another important property of pervaporation membranes. The durability of anionic/cationic copolymer pore-filled membranes was measured in this example.

Anionic and cationic monomers used in this example were AA and APTAC (mole ratio 1:9) respectively, and their concentration was 60 wt. %. All other preparation conditions were the same as in example 1 using the photo-initiated method. After operated with 60° C. 91.5 wt. % IPA/water for 3 hrs, the flux of the membrane was 0.51 Kg/m² hr and the selectivity was 230. Subsequently, the membrane was immersed into 60° C. 91.5 wt. % IPA/water for 60 days. After 60 days, the membrane has a flux of 0.6 Kg/m² hr and the selectivity was 330. This means that the anion/cation pore-filled membranes have good stability, their performance even improves a little after 60 days in 60° C. 91.5 wt. % IPA/water.

Example 18

In this example, water/organic solvent mixture was used as monomer solvent to prepare cationic/anionic pore-filled membranes.

MAETAC and MAA were used as cationic and anionic monomers in this experiment. Their total concentration was 65 wt. % and their mole ratio was 4:1. Instead using water as monomer solvent, water/ethanol (60:40 by weight) mixture solvent was used. PAN HV1,1/T support member was used. All other membrane fabrication conditions are the same as in EXAMPLE 1 using a photo-initiated method. The performance of the membrane was tested at 75° C. with 91.5 wt. % IPA/water mixture. The flux of the membrane is 3.16 Kg/m2 hr, and the IPA concentration in the permeate is 3.5 wt. %.

Another membrane was prepared with water/DMF (N,N-dimethylformamide) (60:40 by weight) mixed solvent. Except changing ethanol to DMF, all other membrane preparation conditions were the same as above. The prepared membrane was used to dehydrate 93.1 wt. % IPA. It has a flux of 2.30 Kg/m2 hr, and the IPA permeate concentration is 2.5 wt. %.

Example 19

In this example, a polypropylene hydrophobic support member was used to prepare cationic/anionic pore-filled membranes.

Polypropylene hydrophobic support members were obtained from 3M Company. One support member PP4, has a porosity of 68.5%, and its pore size is 0.18 μm. The other support member PP5, has a porosity of 80.5%, and its pore size is 0.82 μm. The monomer solution prepared in EXAMPLE 10 with water/ethanol solvent was used in this example.

The performance of the membrane prepared with the PP4 support member was tested at 75° C. with 92.9 wt. % IPA/water mixture. The flux of the membrane was 0.56 Kg/m² hr, and the IPA concentration in the permeate was 7.0 wt. %.

The membrane prepared with the PP5 support member was tested at 75° C. with 93.6 wt. % IPA/water mixture. Its flux was 0.76 Kg/m² hr, and the IPA concentration in the permeate was 2.1 wt. %.

Example 20

In this example, the ethanol separation performance of a composite membrane is enhanced by using an anionic monomer (SSAS) and varying its ratio with respect to a cationic monomer (MAETAC).

A series of membranes were prepared by copolymerizing different mole ratios of the anionic monomer SSAS and cationic monomer MAETAC with the crosslinker methylbisacrylamide (MBAA). The mole ratios of SSAS/MAETAC used were 10:90, 20:80, 30:70, 40:60, 45:55 and 60:40, respectively. The total concentration of the monomers in solution was 55 wt. %, and the amount of initiator was 0.5 wt. % based on the total weight of monomers. A PAN HV 3T ultrafiltration asymmetric membrane, which has a mean pore size of 6.7 nm (as specified by the provider), was used as a support member. All other conditions were the same as in the photo-initiated polymerization method described in Example 1.

Figure 8:
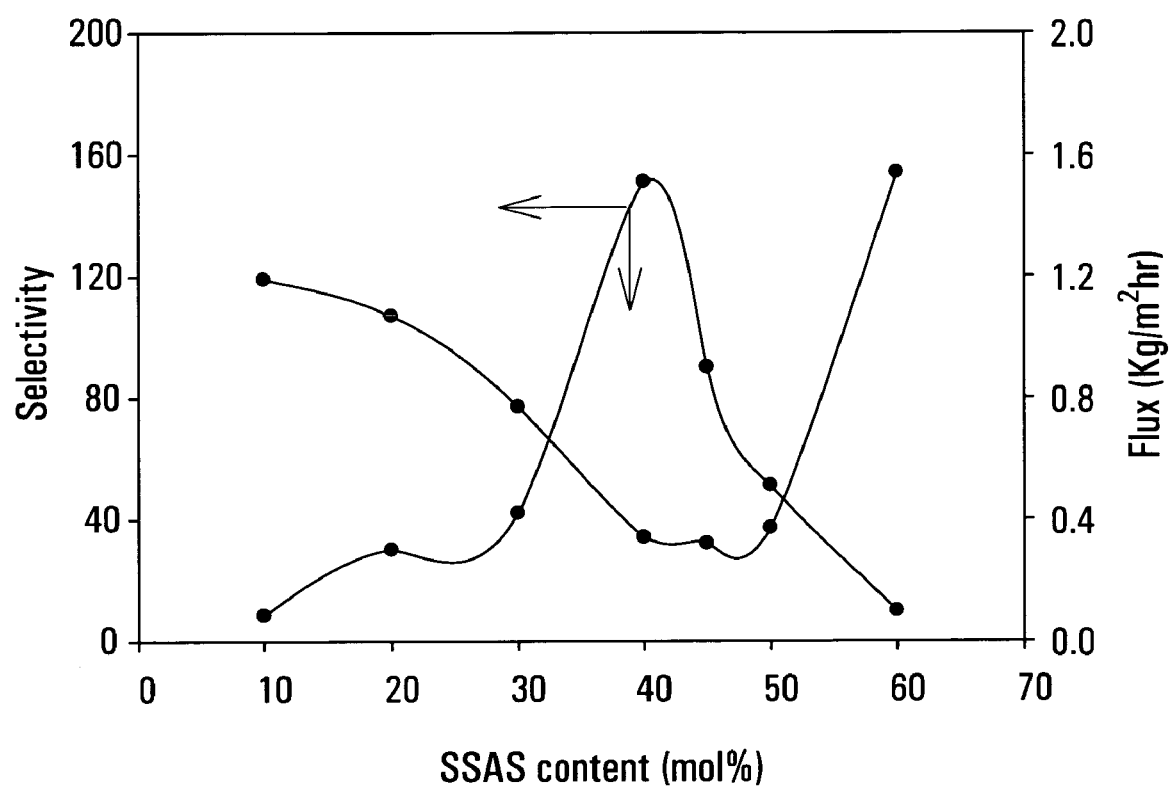
FIG. 8 is a graph illustrating the effect of anionic monomer content on the dehydration performance of anionic/cationic pore-filled membranes with 95 wt. % ethanol at 70° C. The anionic monomer is 4-styrene sulfonic acid, sodium salt (SSAS), and the cationic monomer is [2-(methacryloyloxy) ethyl]trimethylammonium chloride (MAETAC).

The prepared membranes were used to dehydrate a 95 wt. % ethanol 5 wt % water feed at 70° C. The results are shown in FIG. 8. A maximum value in selectivity can be seen at around 40 mol % of SSAS. The flux reaches a minimum value between 40 mol % and 50 mol % SSAS.

Example 21

This example shows the dehydration performance of anionic/cationic pore-filled membranes with low ethylene glycol (EG) feed concentrations.

Membranes were prepared using a method similar to the photo-initiated polymerization method described in Example 1. SSAS and MAETAC were used as anionic and cationic monomers, respectively, in a mole ratio of 4:6, and a total concentration in solution of 55 wt. %. The crosslinking degree was 5 mol. % of total monomers, and the amount of initiator was 0.5 wt. % of the total weight of monomers. A PAN HV 3T ultrafiltration asymmetric membrane was used as support member. All other conditions were the same as in Example 1.

The prepared membrane was used to dehydrate low concentration aqueous EG at 75° C. The results are shown in Table 9, and they demonstrate that the membrane has a very high flux and reasonable separation when the feed EG concentration is lower than 50 wt. %.

TABLE 9

Dehydration of low concentration EG at 75° C.

| EG Conc. (wt. %) | | Selectivity | Flux (Kg/m²hr) |
| --- | --- | --- | --- |
| Feed | Permeate | | |
| 11.9 | 0.47 | 28 | 10.3 |
| 25.4 | 2.90 | 12 | 7.7 |
| 34.4 | 4.33 | 12 | 5.0 |
| 55.7 | 8.73 | 13 | 3.0 |

Example 22

This example describes the performance of large diameter membrane discs for use in a pilot plant.

Membranes were prepared using a method similar to the photo-initiated polymerization method described in Example 1. AMAA and APTAC were used as anionic and cationic monomers, respectively, in a mole ratio of 1:4. Their total concentration in monomer solution was 60 wt. %. The crosslinking degree was 3.5 mol. % of total monomers, and the amount of initiator was 0.5 wt. % of the total monomers weight. Large 65 cm diameter PAN HV 1,1/T ultrafiltration asymmetric membranes were used as support members. All other conditions were the same as in Example 1.

Large 65 cm diameter defect-free pore-filled membranes were easy to prepare with this formulation. The prepared membranes had fluxes of 1.55 Kg/m$^2$ hr and the permeate IPA concentration was 1.33 wt. % when treating 89.7 wt. % IPA feed solution at 75° C. Compared with membranes prepared with other monomers, MAA/APTAC pore-filled membranes were easy to mount on modules in the dry state without forming cracks.

All publications, patents and patent applications cited in this specification are herein incorporated by reference as if each individual publication, patent or patent application were specifically and individually indicated to be incorporated by reference. The citation of any publication is for its disclosure prior to the filing date and should not be construed as an admission that the present invention is not entitled to antedate such publication by virtue of prior invention.

Although the foregoing invention has been described in some detail by way of illustration and example for purposes of clarity of understanding, it is readily apparent to those of ordinary skill in the art in light of the teachings of this invention that certain changes and modifications may be made thereto without departing from the spirit or scope of the appended claims.

It must be noted that as used in this specification and the appended claims, the singular forms "a", "an", and "the" include plural reference unless the context clearly dictates otherwise. Unless defined otherwise all technical and scientific terms used herein have the same meaning as commonly understood to one of ordinary skill in the art to which this invention belongs.

The invention claimed is:

1. A composite membrane comprising
   (a) a support member that has a plurality of pores extending through the support member, wherein the support member is an ultrafiltration membrane comprising a first layer having smaller pores and a second layer having larger pores; and
   (b) a cross-linked copolymer comprising:
   (i) an anionic monomer that is an unsaturated carboxylic acid or anhydride or salt thereof, or an unsaturated sulfonic acid or anhydride or salt thereof;
   (ii) a cationic monomer that is an unsaturated amine or an unsaturated ammonium salt;
   (iii) a cross-linking agent selected from the group consisting of di(ethylene glycol) diacrylate, N,N'-methylenebisacrylamide and trimethylolpropane trimetharylate;
   which cross-linked copolymer fills the pores of the support member,
   the cross-linked copolymer having a permeability for a fluid that is dependent on the polarity of the fluid, wherein the permeability increases with increasing polarity;
   and wherein the support member has a void volume that is not completely occupied by the cross-linked copolymer, and the amount of cross-linked copolymer is greater at or adjacent to a first major surface of the support member than the amount at or adjacent to a second major surface of the support member, wherein said first major surface is defined by said first layer of said support member and said second major surface is defined by said second layer of said support member.

2. A composite membrane according to claim 1, wherein the cross-linked copolymer swells in the presence of a polar fluid.

3. A composite membrane according to claim 1, wherein the cross-linked copolymer is a hydrogel.

4. A composite membrane according to claim 1, wherein the anionic monomer is selected from the group consisting of acrylic acid, 3,3-dimethylacrylic acid, methacrylic acid, maleic acid, itaconic acid, 2-acrylamidoglycolic acid, 2-acryamido-2-methyl-1-propanesulfonic acid, 4-styrene sulfonic acid, and their corresponding anhydride or salt.

5. A composite membrane according to claim 1, wherein the cationic monomer is selected from the group consisting of 3-(acrylamidopropyl)-trimethylammonium salt, [2-(acryloyloxy)ethyl] trimethyl- ammonium salt, diallyldimethylammonium salt, [3-(methacryl-amido)propyl]trimethyl- ammonium salt, and [2-(methacryloyloxy)ethyl] trimethylammonium salt.

6. A composite membrane according to claim 1, wherein the molar ratio of anionic monomer to cationic monomer is from 95:5 to 5:95.

7. A composite membrane according to claim 1, wherein the molar ratio of anionic monomer to cationic monomer is from 1:9 to 1:1.

8. A composite membrane according to claim 1, wherein the molar ratio of anionic monomer to cationic monomer is from 1:9 to 1:3.

9. A composite membrane according to claim 1, wherein the support member is hydrophilic.

10. A composite membrane according to claim 1, wherein the support member is hydrophobic.

11. A composite membrane according to claim 1, wherein the support member is made of cellulose acetate, poly(vinylidene fluoride), polysulfone, polyethersulfone, Nylon 6, poly(ethylene-co-vinyl alcohol), poly(acrylonitrile), polypropylene, poly(tetrafluoroethylene), or poly(vinylchloride).

12. A composite membrane according to claim 1, wherein the support member has pores of an average size of from 0.001 to 0.1 microns.

13. A composite membrane according to claim 1, wherein support member has a porosity of from 25 to 95%.

14. A composite membrane according to claim 1, wherein support member has a porosity of from 45 to 85%.

15. A composite membrane according to claim 1, wherein support member has a porosity from 60 to 80%.

16. A composite membrane according to claim 1, wherein the support member has a thickness of from 10 to 300 microns.

17. A composite membrane according to claim 1, wherein the support member has a thickness of from 20 to 150 microns.

18. A composite membrane according to claim 1, wherein the support member has a thickness of from 50 to 120 microns.

19. The composite membrane according to claim 1, wherein the cross-linked copolymer is located substantially in the first layer.

20. A pervaporation apparatus comprising a composite membrane as claimed in claim 1.

21. A pervaporation apparatus according to claim 20, wherein the pervaporation apparatus is in a plate-and-frame configuration, in a spiral wound configuration or in a hollow fibre configuration.

22. A process for the preparation of a composite membrane according to claim 1, the process comprising
(a) introducing into the pores of the support member a solution comprising:
(i) an anionic monomer that is an unsaturated carboxylic acid or anhydride or salt thereof, or an unsaturated sulfonic acid or anhydride or salt thereof;
(ii) a cationic monomer that is an unsaturated amine or an unsaturated ammonium salt;
(iii) a cross-linking agent selected from the group consisting of di(ethylene glycol) diacrylate, N,N'-methylenebisacrylamide and trimethylolpropane trimetharylate;
(iv) an initiator; and
(b) reacting the anionic monomer, the cationic monomer and the cross-linking agent to form a cross-linked copolymer that fills the pores of the support member.

23. A method for separating fluids of different polarity comprising separating the fluids with a composite membrane as claimed in claim 1.

24. A method for dehydrating an aqueous mixture of an organic solvent comprising dehydrating the aqueous mixture with a composite membrane as claimed in claim 1.

25. The method according to claim 24, wherein the aqueous mixture is a partially miscible mixture.

26. The method according to claim 24, wherein the aqueous mixture is an azeotrope.

27. A method for removing a water by-product from a reaction mixture comprising separating the water from the reaction mixture with a composite membrane as claimed in claim 1.

28. A composite membrane comprising
(a) a support member that has a plurality of pores extending through the support member and,
(b) a cross-linked copolymer comprising (i) a zwitterionic monomer and (ii) a cationic monomer and/or an anionic monomer, which cross-linked copolymer fills the pores of the support member,
the cross-linked copolymer having a permeability for a fluid that is dependent on the polarity of the fluid, wherein the permeability increases with increasing polarity.

29. A composite membrane according to claim 28, wherein the zwitterionic monomer is an unsaturated zwitterion or a precursor thereof that can be readily converted to a zwitterion.

30. A composite membrane according to claim 28, wherein the zwitterionic monomer is selected from the group consisting of 4-imidazoleacrylic acid, 4-aminocinnamic acid hydrochloride, 4-(dimethylamino)cinnamic acid, 1-(3-sulfopropyl)-2-vinylpyridinium hydroxide inner salt, 3-sulfopropyldimethyl-3-methacrylamidopropylammonium inner salt, and 5-amino-1,3-cyclohexadiene-1-carboxylic acid hydrochloride.

31. A composite membrane according to claim 28, wherein the copolymer comprises: a zwitterionic monomer and an anionic monomer; a zwitterionic monomer and a cationic monomer; or a zwitterionic monomer, an anionic monomer and a cationic monomer.

* * * * *

UNITED STATES PATENT AND TRADEMARK OFFICE
CERTIFICATE OF CORRECTION

PATENT NO.        : 7,604,746 B2  
APPLICATION NO.   : 11/114872  
DATED             : October 20, 2009  
INVENTOR(S)       : Childs et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1001 days.

Signed and Sealed this

Fifth Day of October, 2010

David J. Kappos  
*Director of the United States Patent and Trademark Office*